United States Patent
Lee et al.

(10) Patent No.: US 12,174,907 B2
(45) Date of Patent: Dec. 24, 2024

(54) GRAPH CONVOLUTIONAL NETWORKS WITH MOTIF-BASED ATTENTION

(71) Applicant: Adobe Inc., San Jose, CA (US)

(72) Inventors: John Boaz Tsang Lee, Worcester, MA (US); Ryan Rossi, Mountain View, CA (US); Sungchul Kim, San Jose, CA (US); Eunyee Koh, San Jose, CA (US); Anup Rao, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/061,697

(22) Filed: Dec. 5, 2022

(65) Prior Publication Data

US 2023/0169140 A1  Jun. 1, 2023

Related U.S. Application Data

(63) Continuation of application No. 16/297,024, filed on Mar. 8, 2019, now Pat. No. 11,544,535.

(51) Int. Cl.
| | | |
|---|---|---|
| *G06F 17/10* | (2006.01) | |
| *G06F 16/901* | (2019.01) | |
| *G06F 17/16* | (2006.01) | |
| *G06F 18/21* | (2023.01) | |
| *G06F 18/24* | (2023.01) | |
| *G06N 3/047* | (2023.01) | |
| *G06N 3/08* | (2023.01) | |
| *G06V 10/426* | (2022.01) | |
| *G06V 10/82* | (2022.01) | |

(52) U.S. Cl.
CPC .......... *G06F 17/10* (2013.01); *G06F 16/9024* (2019.01); *G06F 17/16* (2013.01); *G06F 18/21* (2023.01); *G06F 18/24* (2023.01); *G06N 3/047* (2023.01); *G06N 3/08* (2013.01); *G06V 10/426* (2022.01); *G06V 10/82* (2022.01)

(58) Field of Classification Search
CPC ...... G06F 17/10; G06F 17/16; G06F 16/9024; G06F 18/24; G06F 18/21; G06V 10/82; G06V 10/426; G06N 3/047; G06N 3/08
USPC .......................................................... 706/20
See application file for complete search history.

(56) References Cited

U.S. PATENT DOCUMENTS

| | | | |
|---|---|---|---|
| 2019/0130264 A1 | 5/2019 | Rossi et al. | |
| 2019/0318227 A1* | 10/2019 | Bronstein | ........... G06F 16/9535 |

OTHER PUBLICATIONS

Amazon, "AWS Lambda Run Code Without Thinking About Servers Pay for the Compute Time You Consume", Amazon, Available online at: https://aws.amazon.com/lambda/, 2019, 13 pages.

(Continued)

*Primary Examiner* — Tsu-Chang Lee
(74) *Attorney, Agent, or Firm* — Kilpatrick Townsend & Stockton LLP

(57) ABSTRACT

Various embodiments describe techniques for making inferences from graph-structured data using graph convolutional networks (GCNs). The GCNs use various pre-defined motifs to filter and select adjacent nodes for graph convolution at individual nodes, rather than merely using edge-defined immediate-neighbor adjacency for information integration at each node. In certain embodiments, the graph convolutional networks use attention mechanisms to select a motif from multiple motifs and select a step size for each respective node in a graph, in order to capture information from the most relevant neighborhood of the respective node.

20 Claims, 15 Drawing Sheets

(56) References Cited

OTHER PUBLICATIONS

Youtube, "Dear Kitten", Youtube, Available online at: https://www.youtube.com/watch?v=G4Sn91t1V4g, Jun. 5, 2014, 3 pages.

Data Council, "Video Understanding at Scale: Deep Learning in a Serverless Infrastructure", Data Council, Available online at: https://www.datacouncil.ai/talks/video-understanding-at-scale-deeplearning-in-a-serverless-infrastructure, Accessed from Internet on Aug. 1, 2019, 5 pages.

U.S. Appl. No. 16/297,024, "Notice of Allowance", Aug. 31, 2022, 12 pages.

Abu-El-Haija et al., "N-GCN: Multi-Scale Graph Convolution for Semi-Supervised Node Classification", Available Online at: https://arxiv.org/pdf/1802.08888.pdf, Feb. 24, 2018, 9 pages.

Ahmed et al., "Edge Role Discovery via Higher-Order Structures", Pacific Asia Knowledge Discovery and Data Mining, 2017, pp. 1-12.

Ahmed et al., "Graphlet Decomposition: Framework, Algorithms, and Applications", Knowledge and Information Systems, vol. 50, Issue 3, Mar. 2017, pp. 689-722.

Ahmed et al., "Learning Role-Based Graph Embeddings", In StarAI @ International Joint Conference on Artificial Intelligence, Jul. 2, 2018, pp. 1-8.

Anderson et al., "Global Diffusion via Cascading Invitations: Structure, Growth, and Homophily", Proceedings of the 24th International Conference on World Wide Web, May 18-22, 2015, pp. 66-76.

Bahdanau et al., "Neural Machine Translation by Jointly Learning to Align and Translate", International Conference on Learning Representations, Available Online at: https://arxiv.org/pdf/1409.0473.pdf, May 19, 2016, pp. 1-15.

Belkin et al., "Manifold Regularization: A Geometric Framework for Learning from Labeled and Unlabeled Examples", Journal of Machine Learning Research, vol. 7, Nov. 2006, pp. 2399-2434.

Benson et al., "Higher-Order Organization of Complex Networks", Science, vol. 353, Issue 6295, Jul. 8, 2016, pp. 163-166.

Bruna et al., "Spectral Networks and Locally Connected Networks on Graphs", Available Online at: https://arxiv.org/pdf/1312.6203.pdf, May 21, 2014, pp. 1-14.

Carranza et al., "Higher-Order Spectral Clustering for Heterogeneous Graphs", Available Online at: https://arxiv.org/pdf/1810.02959.pdf, Oct. 6, 2018, pp. 1-15.

Choi et al., "GRAM: Graph-Based Attention Model for Healthcare Representation Learning", Proceedings of the 23rd ACM SIGKDD International Conference on Knowledge Discovery and Data Mining, Aug. 13-17, 2017, pp. 787-795.

Defferrard et al., "Convolutional Neural Networks on Graphs with Fast Localized Spectral Filtering", Proceedings of the 30th International Conference on Neural Information Processing Systems, Dec. 5-10, 2016, pp. 1-9.

Duvenaud et al., "Convolutional Networks on Graphs for Learning Molecular Fingerprints", Proceedings of the 28th International Conference on Neural Information Processing Systems, vol. 2, Dec. 7-12, 2015, pp. 2224-2232.

Feichtenhofer et al., "Convolutional Two-Stream Network Fusion for Video Action Recognition", The IEEE Conference on Computer Vision and Pattern Recognition, Jun. 26, 2016, pp. 1933-1941.

Frasconi et al., "A General Framework for Adaptive Processing of Data Structures", IEEE Transactions on Neural Networks, vol. 9, No. 5, Sep. 1998, pp. 768-786.

Friggeri et al., "Triangles to Capture Social Cohesion", In SocialCom/PASSAT, Jul. 8, 2011, pp. 1581-1589.

Gori et al., "A New Model for Learning in Graph Domains", Proceedings IEEE International Joint Conference on Neural Networks, Jul. 2005, 6 pages.

Han et al., "Neural Knowledge Acquisition via Mutual Attention Between Knowledge Graph and Text", The Thirty-Second AAAI Conference on Artificial Intelligence, 2018, pp. 1-8.

Hausknecht et al., "Deep Recurrent Q-Learning for Partially Observable MDPs", Sequential Decision Making for Intelligent Agents Papers from the AAAI 2015 Fall Symposium, 2015, pp. 29-37.

He et al., "Deep Residual Learning for Image Recognition", Proceedings of the Institute of Electrical and Electronics Engineers Conference on Computer vision and Pattern Recognition, Jun. 27-30, 2016, pp. 770-778.

Henaff et al., "Deep Convolutional Networks on Graph-Structured Data", Available Online at: https://arxiv.org/pdf/1506.05163v1.pdf, Jun. 16, 2015, pp. 1-10.

Kersting et al., "Benchmark Data Sets for Graph Kernels", Available Online at: http://graphkernels.cs.tu-dortmund.de, 2016, pp. 1-4.

Kim et al., "Deeply-Recursive Convolutional Network for Image Super-Resolution", IEEE Conference on Computer Vision and Pattern Recognition, 2016, pp. 1637-1645.

Kim et al., "Probabilistic Visitor Stitching on Cross-Device Web Logs", Proceedings of the 26th International Conference on World Wide Web, Apr. 3-7, 2017, pp. 1581-1589.

Kipf et al., "Semi-Supervised Classification with Graph Convolutional Networks", Published as a Conference Paper at ICLR 2017, 2017, pp. 1-14.

Krizhevsky et al., "ImageNet Classification with Deep Convolutional Neural Networks", Advances in Neural Information Processing Systems, vol. 25, 2012, pp. 1-9.

La Fond et al., "Randomization Tests for Distinguishing Social Influence and Homophily Effects", Proceedings of the 19th International Conference on World Wide Web, Apr. 26-30, 2010, pp. 601-610.

Lee et al., "Graph Classification Using Structural Attention", Proceedings of the 24th ACM SIGKDD International Conference on Knowledge Discovery & Data Mining, Aug. 19-23, 2018, pp. 1666-1674.

Lee et al., "Identifying Deep Contrasting Networks from Time Series Data: Application to Brain Network Analysis", Proceedings of the 2017 SIAM International Conference on Data Mining, 2017, pp. 543-551.

Li et al., "Gated Graph Sequence Neural Networks", Published as a Conference Paper at ICLR 2016, May 3, 2016, pp. 1-20.

Lu et al., "Link-Based Classification", Proceedings of the Twentieth International Conference on Machine Learning, Aug. 21-24, 2003, pp. 496-503.

Milo et al., "Network Motifs: Simple Building Blocks of Complex Networks", Science, vol. 298, Issue 5594, Oct. 25, 2002, pp. 824-827.

Mnih et al., "Recurrent Models of Visual Attention", Proceedings of the 27th International Conference on Neural Information Processing Systems, vol. 2, Dec. 8-13, 2014, pp. 1-9.

Monti et al., "Geometric Deep Learning on Graphs and Manifolds Using Mixture Model CNNs", Available Online at: https://arxiv.org/pdf/1611.08402.pdf, Dec. 6, 2016, pp. 1-13.

Nguyen et al., "Graph Convolutional Networks with Argument-Aware Pooling for Event Detection", The Thirty-Second AAAI Conference on Artificial Intelligence, 2018, pp. 5900-5907.

Paranjape et al., "Motifs in Temporal Networks", International ACM Conference on Web Search and Data Mining, Feb. 6-10, 2017, pp. 601-610.

Perozzi et al., "DeepWalk: Online Learning of Social Representations", Proceedings of the 20th ACM SIGKDD International Conference on Knowledge Discovery and Data Mining, Aug. 24-27, 2014, pp. 701-710.

Prill et al., "Dynamic Properties of Network Motifs Contribute to Biological Network Organization", PLoS Biology, vol. 3, Issue 11, e343, Nov. 2005, pp. 1881-1892.

Ravasz et al., "Hierarchical Organization in Complex Networks", Physical Review, vol. E 67, Feb. 14, 2003, pp. 1-7.

Rossi et al., "Deep Inductive Network Representation Learning", Companion Proceedings of the Web Conference, Apr. 23-27, 2018, 8 pages.

Rossi et al., "Estimation of Graphlet Counts in Massive Networks", vol. 30, Issue 1, IEEE Transactions on Neural Networks and Learning Systems, May 2018, pp. 1-14.

Rossi et al., "Higher-Order Network Representation Learning", Companion Proceedings of the Web Conference, Apr. 23-27, 2018, pp. 3-4.

(56) References Cited

OTHER PUBLICATIONS

Rossi et al., "HONE: Higher-Order Network Embeddings", Machine Learning (stat.ML), Available online at : https://arxiv.org/pdf/1801.09303.pdf, May 30, 2018, 10 pages.

Sankar et al., "Motifbased Convolutional Neural Network on Graphs", Available Online at: https://arxiv.org/pdf/1711.05697v3.pdf, Feb. 5, 2018, 7 pages.

Sarajlić et al., "Graphlet-Based Characterization of Directed Networks", Scientific Reports, vol. 6, Oct. 16, 2016, pp. 1-14.

Scarselli et al., "The Graph Neural Network Model", IEEE Transactions on Neural Networks, vol. 20, Issue 1, Jan. 2009, pp. 61-80.

Sperduti et al., "Supervised Neural Networks for the Classification of Structures", IEEE Transactions on Neural Networks, vol. 8, Issue 3, May 1997, pp. 1-43.

Sun et al., "Less is More: Compact Matrix Decomposition for Large Sparse Graphs", SIAM International Conference on Data Mining, 2007, pp. 366-377.

Velickovic et al., "Graph Attention Networks", Published as a Conference Paper at ICLR 2018, Feb. 4, 2018, pp. 1-12.

Weston et al., "Deep Learning via Semi-Supervised Embedding", Neural Networks: Tricks of the Trade, 2012, 17 pages.

Xu et al., "Show, Attend and Tell: Neural Image Caption Generation with Visual Attention", Proceedings of the 32 nd International Conference on Machine Learning, 2015, 10 pages.

Yan et al., "Spatial Temporal Graph Convolutional Networks for Skeleton-Based Action Recognition", The Thirty-Second AAAI Conference on Artificial Intelligence, 2018, pp. 7444-7452.

Yang et al., "Node, Motif and Subgraph: Leveraging Network Functional Blocks Through Structural Convolution", IEEE/ACM International Conference on Advances in Social Networks Analysis and Mining, 2018, 8 pages.

Yang et al., "Revisiting Semi-Supervised Learning with Graph Embeddings", Proceedings of the 33 rd International Conference on Machine Learning, 2016, 9 pages.

Zhou et al., "Minimal Gated Unit for Recurrent Neural Networks", International Journal of Automation and Computing, vol. 13, Issue 3, Jun. 2016, pp. 1-9.

Zhu et al., "Semi-Supervised Learning Using Gaussian Fields and Harmonic Functions", Proceedings of the Twentieth International Conference on Machine Learning, 2003, 8 pages.

\* cited by examiner

GRAPH CONVOLUTIONAL NETWORKS WITH MOTIF-BASED ATTENTION

CROSS-REFERENCE TO RELATED APPLICATIONS

This application is a Continuation of U.S. application Ser. No. 16/297,024, filed Mar. 8, 2019, the content of which is incorporated herein by reference.

TECHNICAL FIELD

This disclosure relates generally to graph convolutional networks (GCNs). More specifically, but not by way of limitation, this disclosure relates to graph convolutional networks that select the most relevant neighborhoods (including, but not limited to, one-hop edge-connected neighbors) for individual nodes to integrate information from, and, in some cases, thereby more efficiently filtering graph-structured data and achieving high prediction accuracy based on the graph-structured data.

BACKGROUND

In many real-world problems, such as social networks, collaboration networks, citation networks, telecommunication networks, biological networks (e.g., brain connectomes), financial transactions, transportation networks (e.g., traffic/shipping maps or routes), and the like, data may be better represented by graphs, rather than grids (e.g., matrices). Even though many artificial intelligence and machine-learning techniques have been used to extract knowledge and insights from data in various forms in order to understand and analyze actual phenomena with data (e.g., in many vision-related applications), these techniques generally do not perform well for graph-structured data. For example, convolutional neural network (CNN) models have been applied successfully in image classification, object detection and recognition, video action recognition, and the like. CNN models efficiently implements spatial locality and weight-sharing by reusing local filters to extract features from localized regions (also referred to as receptive fields). However, CNN models are designed to process data that is representable by grids, such as videos, images, or audio clips. It is difficult to directly apply CNN models to many real-world problems where the data is better represented by graphs rather than by grids. In addition, CNN models generally do not perform well for graphs that have more irregular structures, such as the various networks described above. Therefore, an improved graph-based convolutional neural network is needed for performing convolution operations on graph-structured data to extract certain features.

SUMMARY

Embodiments of the present disclosure involve graph convolutional networks (GCNs) for making inferences from graph-structured data. According to certain embodiments, a method for making inferences from graph-structured data includes performing operations by one or more processing devices based on a graph convolutional neural network model that includes one or more graph convolutional layers. The operations include, by at least one graph convolutional layer of the graph convolutional neural network model, receiving a dataset that identifies a set of entities representable by nodes in a graph, features for each respective entity that are representable by attributes of the corresponding node in the graph, and connections among the set of entities, where the connections are representable by edges connecting the nodes in the graph. The operations also include, for each respective node in a set of nodes from the nodes in the graph, selecting one type of motif from multiple types of motifs, selecting neighboring nodes in the graph that are connected to the respective node through one or more motifs of the type of motif, determining a new attribute of the respective node based on attributes of the selected neighboring nodes, and sending information indicative of the new attribute of the respective node as an output of the at least one graph convolutional layer. The operations further include classifying an entity in the set of entities or determining a connection between two entities in the set of entities, based on outputs of a graph convolutional layer of the graph convolutional neural network model. In some embodiments, the set of entities includes user sessions for accessing a web-based application, and determining the connection between two entities includes determining that two user sessions represented by the two entities are associated with a same user.

In some embodiments, a graph convolutional network implemented by a computing system includes one or more layers each including a graph convolutional layer. The graph convolutional layer is configured to receive a dataset that identifies a set of entities representable by nodes in a graph, features for each respective entity that are representable by attributes of the corresponding node in the graph, and connections among the set of entities, where the connections are representable by edges connecting the nodes in the graph. The graph convolutional layer is also configured to, for each respective node in a set of nodes from the nodes in the graph, select one type of motif from multiple types of motifs, select neighboring nodes in the graph that are connected to the respective node through one or more motifs of the type of motif, determine a new attribute of the respective node based on attributes of the selected neighboring nodes, and send information indicative of the new attribute of the respective node as an output of the graph convolutional layer. The graph convolutional network also includes a fully-connected layer or a softmax engine configured to make an inference regarding the set of entities based on outputs of a layer of the one or more layers.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 7A illustrates an example of a graph. FIG. 7B illustrates a motif-induced graph generated based on the graph shown in FIG. 7A and 4-clique motifs. FIG. 7C illustrates a motif-induced graph generated based on the graph shown in FIG. 7A and 4-path motifs.

DETAILED DESCRIPTION

Figure 1:
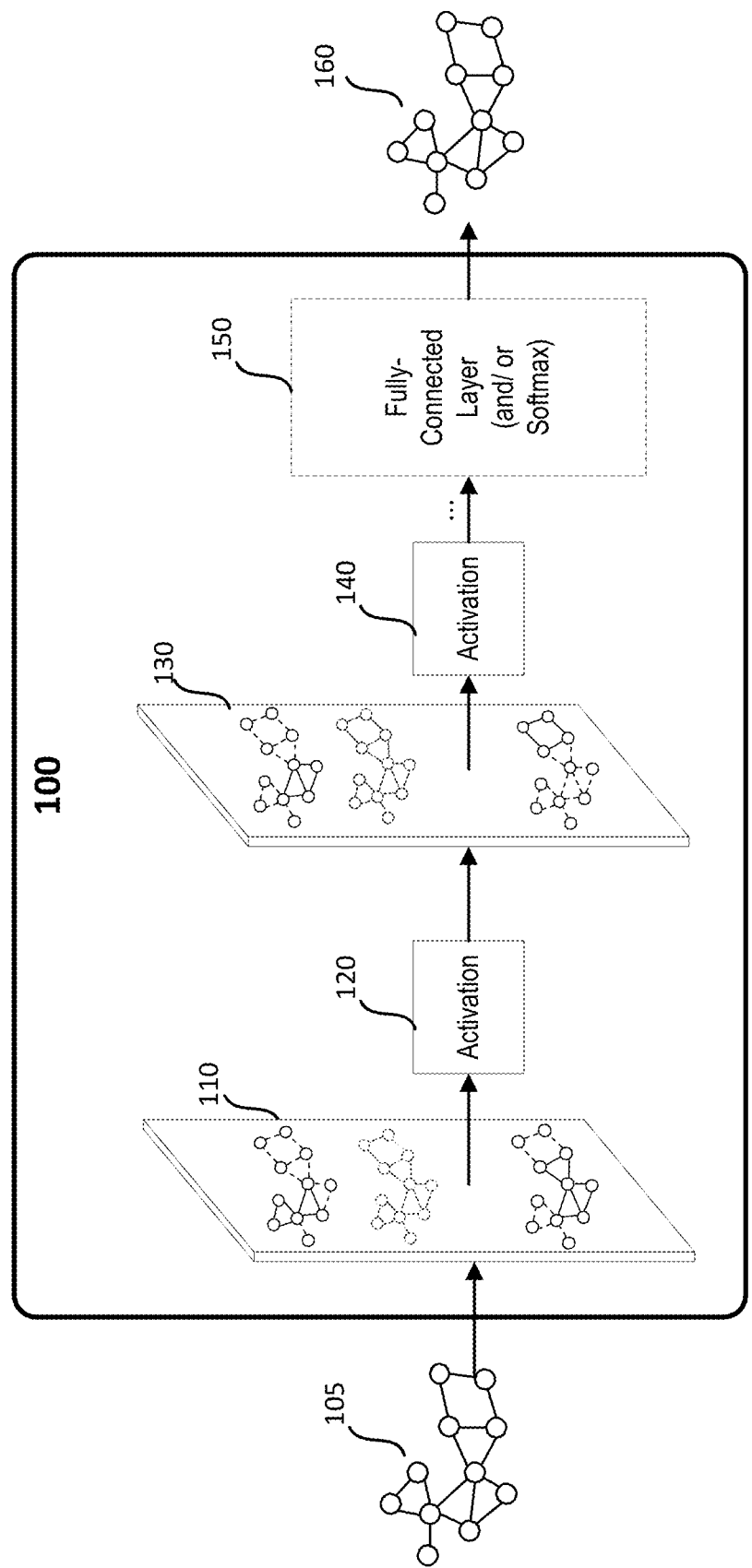
FIG. 1 illustrates an example of a graph convolutional network with motif-based attention for graph-based predictive modeling according to certain embodiments.

Graph convolutional networks (GCNs) perform convolution operations on graph-structured datasets better than convolutional neural network (CNN) models. However, GCNs generally only use edge-defined immediate neighbors (i.e., nodes connected to a target node through one edge, which is herein referred to as one-hop edge-based adjacency) for information integration at each target node. In many applications, such GCNs based on one-hop edge-based adjacency are not efficient or would not make correct predictions.

According to certain techniques disclosed herein, rather than merely using the edge-defined immediate-neighbor adjacency for information integration at each target node, graph convolutional networks disclosed herein select different pre-defined patterns or subgraphs (such as edges, triangles, etc., which are collectively referred to as motifs) to filter or select adjacent nodes for graph convolution at different individual nodes. In one example, nodes that are connected to a target node through one or more triangles (referred to as multi-hop motifs) in the graph are selected for information integration at the target node. The graph convolutional networks disclosed herein also have the flexibility to select different multi-hop muotifs for a same target node in different graph convolutional layers in a graph convolutional network. Because the graph convolutional network selects neighborhoods (i.e., receptive fields) using multi-hop motifs for graph convolution at individual nodes, it is herein referred to as a motif convolutional network (MCN) in order to distinguish it from other graph convolutional networks.

The following non-limiting example is used to introduce certain embodiments. In this example, a computing system including one or more processors is used to implement a multi-layer motif convolutional network (MCN) to identify multiple accesses to a web-based service as originated by a same user, which is herein referred to as user (or visitor) stitching. A user accesses web-based services from a wide range of devices, such as desktop and laptop computers at both home and work, mobile devices (e.g., tablets or smart phones), vehicles, and entertainment systems. In many circumstances, user experience with the web-based services is improved if the web-based services learn or infer user preferences from user interactions with the web-based services using various user devices and in different access sessions, so as to provide customized content in user preferred manners. However, users often access web-based services in anonymous sessions, making it difficult to identify the users in different sessions in order to learn attributes (e.g., the preferences) of specific users and provide services tailored for the specific users. The MCNs described herein identify the user of a particular session or link different sessions to a same user.

In this example, the MCN includes multiple graph convolutional layers. Each graph convolutional layer receives as input a graph-structured dataset that represents user sessions for accessing the web-based application. Each user session is considered an entity that is represented by a node in a graph. Information associated with the user session (i.e., features of the entity, such as, for example, time, IP address, device ID, user ID, etc.) is represented by attributes of the node in the graph. The graph-structured dataset includes some connections among user sessions (i.e., entities), which are represented by edges connecting the nodes in the graph.

Continuing with this example, each graph convolutional layer of the MCN is configured to select, for each node in a set of nodes in the graph, a respective type of motif from multiple pre-defined types of motifs (e.g., edges, triangles, etc.) and a respective step size k from a set of step sizes (e.g., 1 to K) using an attention mechanism. The attention mechanism uses a node state matrix and two trainable functions to produce a probability vector indicating the relevancy of different motifs and a probability vector indicating the relevancy of different step sizes for each respective target node, and then select the motif and step size for each respective target node based on the probability vectors. The type of motif and step size k selected for a target node in the graph together define a most relevant neighborhood of the target node for information integration (i.e., graph convolution), where the neighborhood includes all nodes that are connected to the target node by no more than k motifs of the selected type of motif. The graph convolutional layer then combines (e.g., as a weighted sum of) features of the nodes in the defined neighborhood to extract new features for the target node. An activation engine applies a nonlinear function (e.g., ReLU) to the output from a graph convolutional layer and send the output to the next graph convolutional layer. A fully-connected layer or a softmax engine then uses features in the output of the last graph convolutional layer to determine, for example, whether there likely is an edge connection between two nodes that are not connected by an edge in the input dataset. For example, output features of one node are multiplied with output features of another node, an activation function is applied to the product, and the result indicates the probability that the two nodes (i.e., user sessions) are associated with a same user.

MCNs disclosed herein use different motifs (e.g., patterns or subgraphs) and/or different distances (i.e., step sizes) to select the most relevant neighborhood for each respective node, rather than only selecting directly connected neighboring nodes for each node. Thus, MCNs disclosed herein more effectively filter out noisy nodes or nodes that do not have strong relations with a target node, and select nodes within a wider range to capture higher order interactions between nodes. Therefore, MCNs disclosed herein are more accurate and more efficient compared with other GCNs. In addition, because trainable attention mechanisms are used to select the best motif and step size, only one neighborhood is used for information integration for each respective node on each graph convolutional layer. Thus, the amount of computation is low. Therefore, MCNs disclosed herein can be used to make inferences from large datasets in reasonably short time periods. Furthermore, MCNs disclosed herein have the flexibility to implement different types of graph convolutional networks. For example, when one-hop edge motif is selected for all nodes, the graph convolutional network becomes a graph convolutional network based on one-hop edge-based adjacency.

MCNs disclosed herein is applicable to any graph-structured dataset, such as datasets representing social networks, collaboration networks, citation networks, telecommunication networks, biological networks (e.g., brain connectomes), financial transactions, transportation networks, and the like. MCNs disclosed herein can be used for various applications, such as link prediction or entity resolution (e.g., visitor or user stitching), entity (node) classification, graph classification, medical diagnosis, determining side effects of drugs, detecting fraudulent financial transactions, logistics planning, and the like, using various graph-structured input data.

As used herein, an "entity" refers to any object or item that has attributes or properties associated with it. In one example, an entity includes a person, such as a user of a service, a member of a social network, a researcher in a citation network, or the like. In another example, an entity includes an object or an item, such as a user session with a web-based application, a financial transaction, an image, or the like.

As used herein, the term "graph" refers to a structure that models pairwise relations among entities in a dataset. A graph includes a set of nodes (also referred to as vertices or points) and a set of undirected or directed edges (also referred to as arcs or lines) connecting the set of nodes. When the edges are directed, the graph is a directed graph. When the edges are undirected, the graph is an undirected graph. Each node in a graph corresponds to an entity in the dataset represented by the graph, and features of a node correspond to attributes of the corresponding entity. A dataset representable by a graph is referred to as a graph-structured dataset.

As used herein, the term "graph convolutional neural network model" refers to a neural network model configured to perform graph convolution on graph-structured data. A graph convolutional neural network model includes a plurality of graph convolutional layers arranged according to a certain order to perform layer-wise information integration and propagation for individual nodes. At each graph convolutional layer, information for each respective node is determined by integrating (e.g., as a weighted sum of) information of nodes in a localized region (referred to as a receptive field or a neighborhood) near the respective node.

As used herein, the term "trainable function" refers to a function, at least some parameters of which are determined using techniques, such as regression, risk minimization, back propagation, clustering, and the like, with or without using training data.

As used herein, the term "feature matrix" refers to a matrix that describes a set of features or attributes of a set of entities (e.g., users or other objects) in a graph-structured dataset. Each entity is represented by a node (or a vertex, which is used interchangeably with the term "node" in this disclosure) in a graph. For example, each column of a feature matrix corresponds to a feature, and each row of the feature matrix is an entry that represents one entity, where each element in the row describes a corresponding feature or attribute of the entity, such as an identification or a characteristic of the entity.

As used herein, the term "adjacency matrix" refers to a square matrix used to represent the structural information of a finite graph. The elements of an adjacency matrix indicate whether each pair of vertices in the graph is adjacent or not. An adjacency matrix stores the number of connections (e.g., edges or triangles) between each pair of vertices in the corresponding matrix element. In one example, an adjacency matrix stores the number of edges directly connecting each respective pair of vertices in the corresponding matrix element, where the adjacency matrix is referred to as a one-hop edge-induced adjacency matrix. In some examples, a connection between two vertices is through patterns that each include the two vertices, rather than only through edges directly connecting the two vertices. For example, any two vertices in a polygon (e.g., pentagon) are "connected" to each other through the polygon. In some embodiments, an adjacency matrix includes a normalized adjacency matrix.

As used herein, the term "neighborhood" refers to a subgraph adjacent to a node in a graph. In some examples, a Kth-order neighborhood of a node refers to the set of nodes that lie within a distance K (i.e., K hops or K steps) from the node.

As used herein, the term "motif" refers to a connected subgraph or pattern with a well-defined structure. A motif includes two or more vertices connected according to a pattern. A motif indicates a particular pattern of interactions between vertices. A motif includes, for example, a 2-dimensional subgraph or pattern, a 3-dimensional shape (e.g., a pyramid), or any multi-dimensional pattern or shape. A motif having two to four vertices includes, for example, an edge, a triangle, a 4-path, a 4-cycle, a tailed triangle, a chordal-cycle, a 4-clique, and the like. As used herein, the term "multi-hop motif" refers to multiple connected motifs of a same type, such as multiple connected triangles.

As used herein, the term "degree of a vertex" refers to the number of connections between the vertex and adjacent vertices through motifs of a particular type, such as edges or triangles. In some embodiments, an adjacency matrix is normalized based on the degrees of the vertices.

As used herein, the term "motif-induced adjacency matrix" refers to an adjacency matrix where the connections between vertices include connections made through a particular type of motifs. In one example, an element $(A_t)_{i,j}$ in a one-hop motif-induced adjacency matrix indicates the number of motifs of a particular type t that each include both vertex $V_i$ and vertex $V_j$. In another example, a k-hop motif-induced adjacency matrix is the kth power of the corresponding one-hop motif-induced adjacency matrix.

As used herein, the term "attention" or "attention mechanism" refers to a mechanism that aids a model to focus on the most relevant parts of the input to make decisions. Some attention mechanisms allow a model to avoid or ignore noisy parts of a graph, thus improving the signal-to-noise ratio (SNR). Some attention mechanisms allow a model to assign relevance scores to respective nodes in a graph to highlight nodes with the most task-relevant information.

As used herein, the term "neural network" refers to one or more computer-implemented, network-based models capable of being trained to achieve a goal. Unless otherwise indicated, references herein to a neural network include one neural network or multiple interrelated neural networks that are trained together. Examples of neural networks include, without limitation, convolutional neural networks (CNNs), recurrent neural networks (RNNs), fully-connected neural networks, dense-connection neural networks, feed-forward neural networks, graph convolutional network, graph attention networks, and other types of neural networks. In some embodiments, a neural network is implemented using special hardware (e.g., GPU, tensor processing units (TPUs), or processing element arrays (PE arrays)), using software code and a general purpose processor, or a combination of special hardware and software code.

Some frequently used symbols in this disclosure are described in Table 1 below.

TABLE 1

Symbol notations

| Symbol | Note |
|---|---|
| $\mathcal{G}$ | Undirected graph with vertex set $\mathcal{V}$ and edge set $\varepsilon$. |
| N | Number of nodes in $\mathcal{G}$, i.e., $|\mathcal{V}| = N$. |
| $\mathcal{H}$ | A set of T motifs (i.e., subgraphs) $\{H_1, \ldots, H_T\}$. |
| $A_t$ | N × N motif-induced adjacency matrix corresponding to motif $H_t$, where $(A_t)_{i,j}$ indicates the number of motifs of type $H_t$ that each include nodes i and j. When the subscript t is ommitted, it refers to the default edge-defined adjacency matrix. |
| $\tilde{A}_t$ | N × N motif-induced adjacency matrix $A_t$ with self-loops added. |
| $\tilde{D}_t$ | N × N diagonal degree matrix of $\tilde{A}_t$. |
| F | Number of features or attributes for each node. |
| X | N × F feature matrix (also referred to as attribute matrix). |
| $H^{(l)}$ | Node feature embedding input at layer l, where $H^{(1)} = X$ at the first layer. |
| $W^{(l)}$ | Trainable embedding matrix at layer l. |
| $\mathcal{N}_i^{(\tilde{A})}$ | The set of neighbors of node i with respect to adjacency matrix $\tilde{A}$, i.e., $\{j \mid \tilde{A}_{i,j} \neq 0, \text{ for } 1 \leq j \leq N\}$. |
| $R_i$ | Reinforcement learning reward corresponding to training sample i. $R_i = 1$ if node i is classified correctly, otherwise $R_i = -1$. |

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

As described above, CNN models are designed to process data that is representable by grids or matrices. It is difficult to directly apply CNN models to many real-world problems where the data is better represented by graphs, and CNN models generally do not perform well for graphs that have more irregular structures. Some graph convolutional networks (GCNs) implement layer-wise information propagation for individual nodes, where, at each layer, information for each respective node is determined based on information from immediate neighboring nodes that have direct edge connections to the respective node. However, these GCNs do not capture higher order interactions between nodes in the graph, and thus would not be accurate or efficient for some graph-structured data. Some GCNs use multiple motifs to select multiple neighborhoods for each node in the graph, perform information integration in each of the multiple neighborhoods, and then combine the results (e.g., as a weighted sum) from the multiple neighborhoods to determine a feature embedding for the node. These GCNs are not easy to scale due to the large amount of computation at each mode, and are not efficient or practical for datasets that include a large number of nodes or motifs.

According to certain embodiments, graph convolutional networks with motif-based attention (also referred to as motif convolutional networks (MCNs)) are disclosed to capture information from more relevant neighboring nodes for each individual node. In some embodiments, multi-hop motifs are used to capture information from more relevant higher-order neighborhoods (e.g., within a longer distance) of individual nodes. In some embodiments, a motif attention mechanism is used to select the most relevant motif-induced neighborhoods for information integration at each respective node in a graph, where different motifs and/or different distances (e.g., number of hops) are selected and used to determine the most relevant neighborhoods for different nodes.

FIG. 1 illustrates an example of a graph convolutional network (GCN) 100 with motif-based attention (i.e., MCN) for graph-based predictive modeling according to certain embodiments. GCN 100 includes one or more graph convolutional layers, such as graph convolutional layer 110 and graph convolutional layer 130. The graph convolutional layers perform graph convolution operations (i.e., information integration in localized subareas) on graph-structured input data 105. An activation engine, such as activation engine 120 or 140, is inserted between adjacent graph convolutional layers to apply a nonlinear function to the outputs of graph convolutional layer 110 or 130. GCN 100 also includes a fully-connected layer 150 and/or a softmax engine for making the prediction or classification on output graph 160. In some embodiments, one or more dropout layers are added before one or more graph convolutional layers. A dropout layer is used to mask (e.g., ignore) some nodes at a graph convolutional layer to reduce or prevent overfitting in the network, and to reduce the training time. The dropout technique is a good regularization technique and has the advantages of sampling the neighborhood during training to keep the receptive field from growing too large during training.

Each graph convolutional layer (e.g., graph convolutional layer 110 or 130) performs the graph convolution by integrating information (e.g., features or attributes) from nodes in a localized subgraph (e.g., a neighborhood) for each respective target node to determine new features or attributes for the respective target node. In some embodiments, the localized subgraph for each respective target node is selected based on the immediately adjacent nodes that each connect to the respective target node through an edge. In some embodiments, the localized subgraph for each respective target node is selected based on different criteria. For example, in some embodiments, a subgraph including nodes that are no more than multiple hops away from a target node and/or nodes that form a particular pattern (i.e., a motif) with the target node is selected as the localized subgraph for information integration. Details of the motif-based attention mechanism that selects the appropriate motif and/or the number of hops (i.e., distance) are described below with respect to certain embodiments.

The graph-structured input data to a graph convolutional layer l is represented by a feature matrix and an adjacency matrix. The adjacency matrix describes the graph structures, such as the nodes and edges in a graph. As described above, the adjacency matrix is a square matrix that stores, for example, the number of connections (e.g., through edges or other motifs) between each pair of vertices in a corresponding matrix element. For example, if the graph-structured data includes N entities, the adjacency matrix is a N×N matrix. In some embodiments, the adjacency matrix includes a normalized graph structure. In some embodiments, the adjacency matrix is customized based on the motif and the number of hops determined for each respective node to select the appropriate neighborhood for the respective node as described above. The adjacency matrix is pre-determined as described in more detail below. The feature matrix is a N×F$^l$ matrix that includes a set of F$^l$ features for each of the N entities, where each row of the feature matrix represents one entity and each column of the feature matrix corresponds to one feature.

To perform the graph convolution, graph convolutional layer l multiplies the adjacency matrix and the feature matrix, and then multiply the product of the adjacency matrix and the feature matrix by a weight matrix. The weight matrix includes an F$^l$×F$^{l+1}$ matrix, where F$^{l+1}$ is the number of features used in the next graph convolutional layer l+1. The weight matrix is trainable. The output of graph convolutional layer l is thus a N×F$^{l+1}$ feature matrix. The operations of each graph convolutional layer in the graph convolutional network with motif-based attention (i.e., MCN) are described in details below.

Activation engine 120 performs an activation function on the outputs of graph convolutional layer 110. The purpose of the activation function is to introduce nonlinearity into the output of a network layer because most real world functions are nonlinear and it is desirable that the network learns these nonlinear representations. The activation function takes a number and perform a certain fixed mathematical operation on it. Several activation functions may be used. One example of the activation function is the sigmoid function σ(x), which takes a real-valued input x and transforms it into a value between 0 and 1 according to:

$$\sigma(x)=1/(1+\exp(-x)). \quad (1)$$

Another example of the activation function is the tanh function, which takes a real-valued input x and transforms it into a value within the range of [−1, 1] according to:

$$\tanh(x)=2\sigma(2x)-1. \quad (2)$$

A third example of the activation function is the rectified linear unit (ReLU) function. The ReLU function takes a real-valued input x and thresholds it above zero (i.e., replacing negative values with zero):

$$f(x)=\max(0,x). \quad (3)$$

Another example of the activation function is the leaky ReLU function, which is defined as:

$$\text{Leaky ReLU}(x)=\max(0,x)+\alpha\min(0,x), \quad (4)$$

where α is a pre-determined parameter or a parameter that is learned.

The output of activation engine 120 is a N×F$^{l+1}$ feature matrix, which is used as the input feature matrix for graph convolutional layer 130. The adjacency matrix for graph convolutional layer 130 may be the same as or may be different from the adjacency matrix for graph convolutional layer 130. Graph convolutional layer 130 performs similar matrix multiplication operations as graph convolutional layer 110 and send the results to activation engine 140, which then applies, for example, the leaky ReLU function on outputs from graph convolutional layer 130, and then pass the outputs as the input feature matrix for the next graph convolutional layer.

The outputs from the last graph convolutional layer of graph convolutional layer 110 are passed to fully-connected layer 150 and/or the softmax engine to make prediction, classification, or other inferences. For example, for node classification, a softmax function is applied to the features of the node to be classified. For graph classification, a softmax function is applied to features of all nodes in the graph. For link prediction, features of one node are multiplied by features of another node, and an activation function is applied to the product.

Although not shown in FIG. 1, in some embodiments, one or more dropout layers are used, for example, in front of one or more graph convolutional layers. A dropout layer is used to mask (e.g., ignore) some nodes at a graph convolutional layer to reduce or prevent overfitting in the network, and to reduce the training time. The dropout technique is a good regularization technique and has the advantages of sampling the neighborhood during training to keep the receptive field from growing too large during training.

Figure 2:
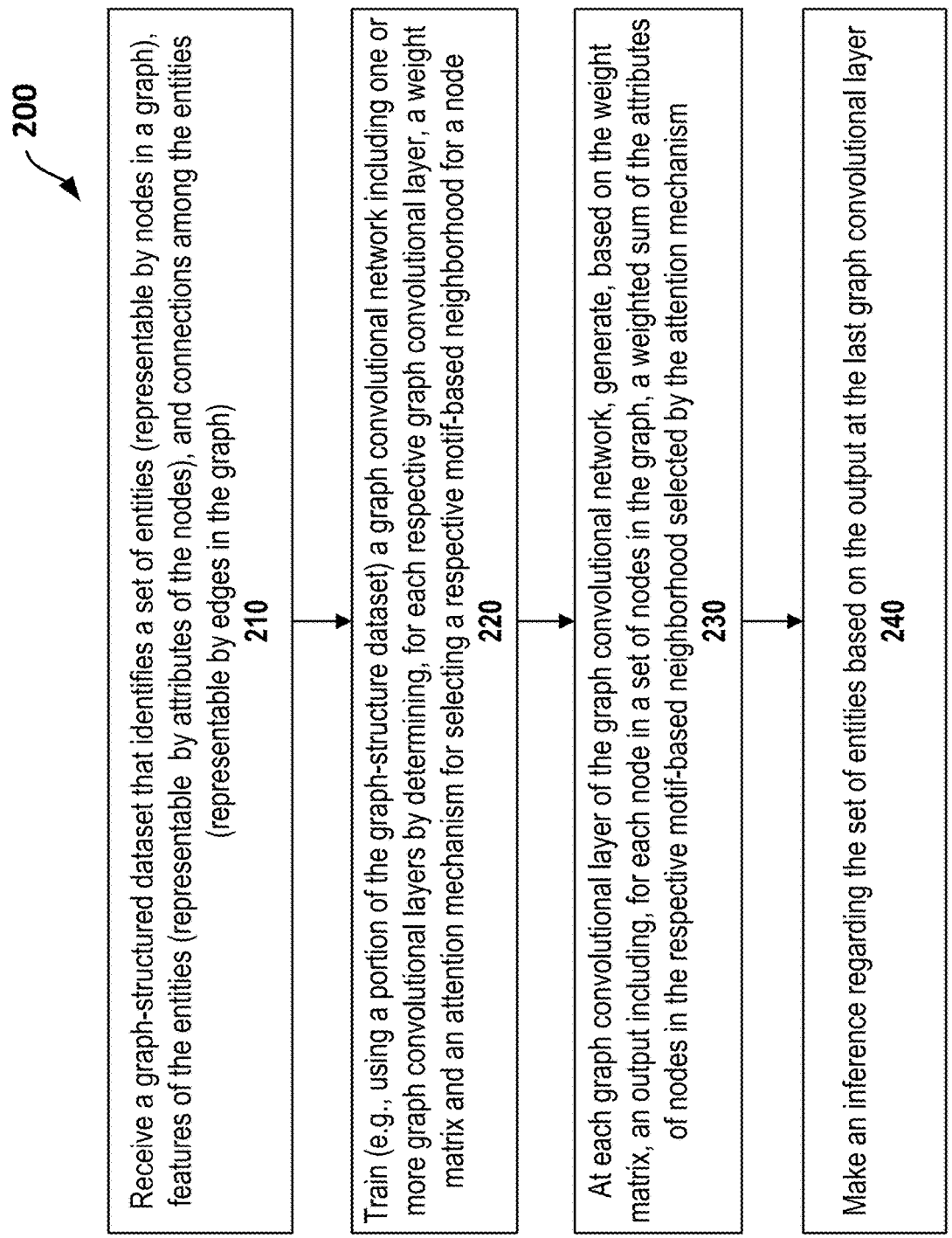
FIG. 2 is a flow chart illustrating an example of a method for performing graph-based prediction using graph convolutional networks with motif-based attention according to certain embodiments.

FIG. 2 is a flow chart 200 illustrating an example of a method for performing graph-based prediction using graph convolutional networks with motif-based attention according to certain embodiments. The operations in flow chart 200 are performed by, for example, one or more computing systems implementing graph convolutional network 100 described above.

At block 210, the one or more computing systems receive a graph-structured dataset that identifies a set of entities (e.g., sessions of web-based services or users of social networks), features of the entities (e.g., attributes of the sessions or users), and connections between the entities (e.g., relations or links between the sessions or users). The set of entities is represented by nodes in a graph, where the features of the entities are represented by attributes of the nodes, and the connections between the entities are represented by edges that each connect a pair of nodes in the graph.

At block 220, the one or more computing systems perform a training process to train a graph convolutional network that includes two or more graph convolutional layers, for example, using a portion of the graph-structure dataset. The training process determines, for each graph convolutional layer, a weight matrix and an attention mechanism for selecting a motif-induced neighborhood for each respective node in a set of nodes in the graph. In some embodiments, the training process includes a reinforcement learning process that rewards actions that cause a correct prediction or other inferences. The training is based on a portion of the graph-structured dataset that includes some entities with known labels (e.g., classifications) or with known relations (e.g., connections). The trained weight matrix is used to embed features into different (e.g., lower) dimensions. The trained attention mechanism is used to select the most relevant neighborhood for each respective node in the graph, which includes selecting an appropriate motif and/or an appropriate distance (e.g., step size or number of hops) that define the most relevant motif-induced neighborhood. Examples of the training process, the weight matrix, and the attention mechanism are described in detail below.

At block 230, at each graph convolutional layer of the trained graph convolutional network, the one or more computing systems generate an output of the graph convolutional layer based on, for example, input attributes of the nodes, the structure of the graph, and the weight matrix. The output includes, for each node in a set of nodes in the graph, a weighted sum of the attributes of the nodes in the respective motif-induced neighborhood determined by the attention mechanism. The weighted sum represents a node's new features or attributes extracted from its motif-induced neighborhood. The output from a graph convolutional layer is processed by an activation engine that applies a nonlinear function as described above to the output, and is then used as the input to a subsequent graph convolutional layer. In each subsequent graph convolutional layer, attributes of nodes in a wider neighborhood of a target node are integrated (e.g., as a weighted sum) to extract new attributes for the target node. Examples of the operations of the graph convolutional layer are described in detail below.

At block 240, the one or more computing systems make an inference regarding the set of entities based on the output at the last graph convolutional layer that includes extracted attributes for the nodes in the graph. As described above, the one or more computing systems implement a fully-connected layer and/or a softmax engine to make prediction or classification. For example, for node (i.e., user) classification, a softmax function is applied to the features of the node to be classified. For graph classification, a softmax function is applied to features of all nodes in the graph. For link prediction (e.g., user stitching), features of one node are multiplied by features of another node, and an activation function is applied to the product. Example of GCNs for node classification and link prediction are described in detail below.

As described above, graph convolutional network 100 uses various motifs to select nodes within different neighborhoods for information integration at different target nodes in the graph, where the different neighborhoods include nodes within different distances from respective target nodes and/or nodes forming different structural relationships (i.e., motifs) with the respective target nodes. Thus, graph convolutional network 100 has the flexibility to implement different types of graph convolutional networks. For example, when the neighborhoods for all nodes are selected based on one-hop edge motifs, graph convolutional network 100 becomes a graph convolutional network based on one-hop edge-based adjacency.

Figure 3:
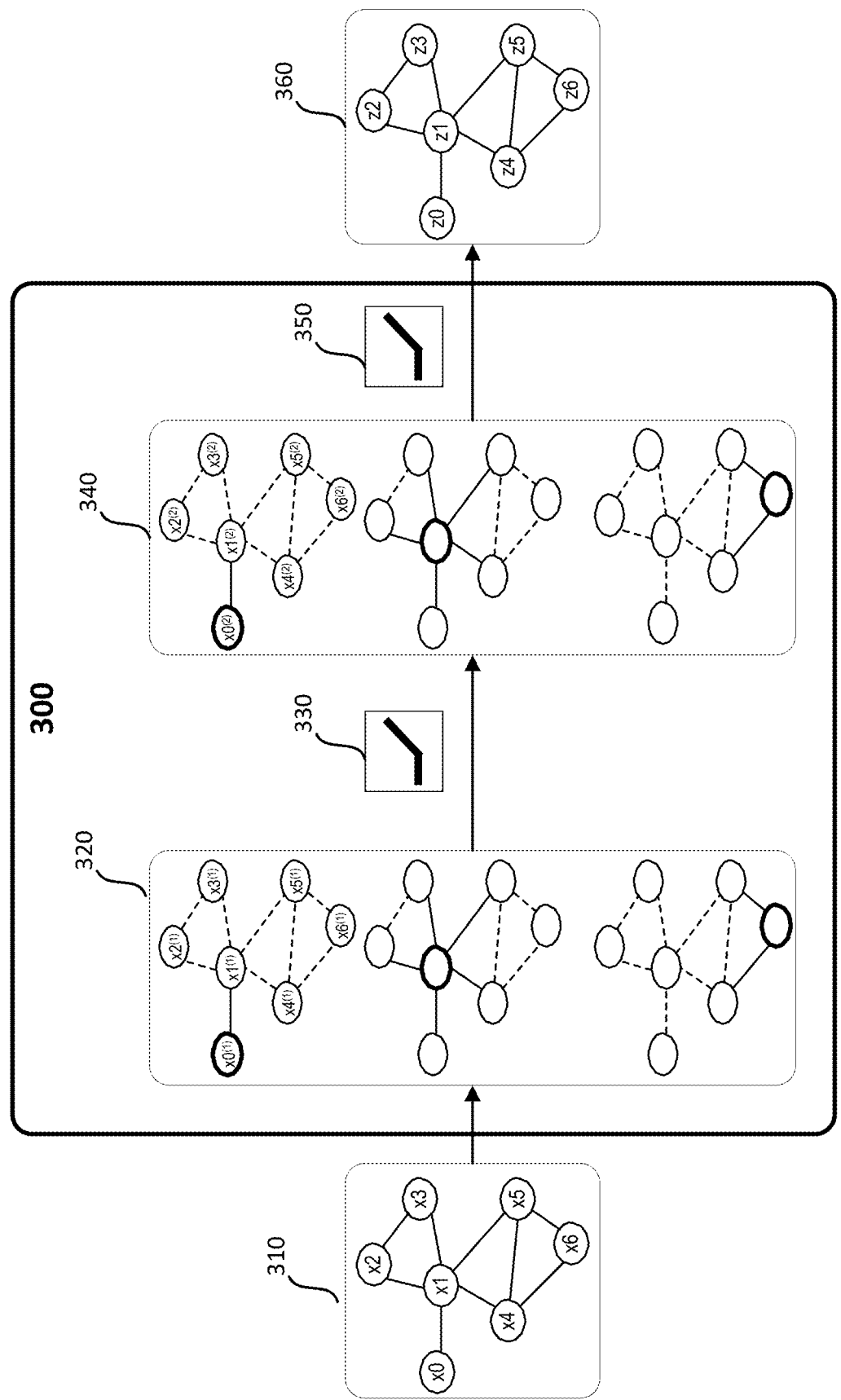
FIG. 3 illustrates an example of a graph convolutional network with motif-based attention that implements a deep graph convolutional network using one-hop edge-based adjacency according to certain embodiments.

FIG. 3 illustrates an example of a graph convolutional network with motif-based attention that implements a deep graph convolutional network 300 based on one-hop edge-based adjacency according to certain embodiments. Graph convolutional network 300 includes two graph convolutional layers 320 and 340 and two activation engines 330 and 350. Graph convolutional network 300 takes graph-structured input data and generates graph-structured output data. It is noted that, in some embodiments, graph convolutional network 300 includes more than two graph convolutional layers and more than two activation engines. In some embodiments, one or more dropout layers are used to reduce or avoid overfitting as described above with respect to FIG. 1.

Input data to graph convolutional network 300 is represented by an input graph 310 that includes nodes (or vertices) $x_0$, $x_1$, $x_2$, $x_3$, $x_4$, $x_5$, $x_6$, and the like, where each node includes a set of features. Input graph 310 is described as a graph $\mathcal{G} = (V, \varepsilon)$, where V is the set of vertices in input graph 310, $N=|V|$ is the total number of nodes in input graph 310, $\varepsilon$ is the set of edges in input graph 310, and $M=|\varepsilon|$ is the number of edges in input graph 310. Input graph 310 is represented by a feature matrix X and an adjacency matrix A. Feature matrix X includes the input features of the graph-structured data and includes an $N \times F^l$ matrix, where $F^l$ is the number of input features for each node. Adjacency matrix A is an $N \times N$ matrix describing the graph structure. In the example shown in FIG. 3, adjacency matrix A is written as:

$$A = \begin{bmatrix} 0 & 1 & 0 & 0 & 0 & 0 & 0 \\ 1 & 0 & 1 & 1 & 1 & 1 & 0 \\ 0 & 1 & 0 & 1 & 0 & 0 & 0 \\ 0 & 1 & 1 & 0 & 0 & 0 & 0 \\ 0 & 1 & 0 & 0 & 0 & 1 & 1 \\ 0 & 1 & 0 & 0 & 1 & 0 & 1 \\ 0 & 0 & 0 & 0 & 1 & 1 & 0 \end{bmatrix}, \quad (5)$$

where each row represents one node $x_i$, each column represents one node $x_j$, and each element indicates whether there is an edge between node $x_i$ and node $x_j$. For example, a value "0" indicates that there is no edge connection between two nodes, and a value "1" indicates that there is no edge connection between two nodes. It is noted that there is no self-loop for any code, and thus $A_{i,i}=0$ in adjacency matrix A.

The output of graph convolutional network 300 is an output graph 360, which includes nodes $z_0$, $z_1$, $z_2$, $z_3$, $z_4$, $z_5$, $z_6$, and the like, where each node includes a set of features. Output graph 360 includes more or less information compared with input graph 310. For example, output graph 360 includes additional features for certain nodes, such as predicted information for some nodes in node-classification applications, or predicted links between certain modes in link-prediction (e.g., user-stitching) applications.

The operation of each graph convolutional layer l in GCN 300 is written as:

$$H^{(l+1)} = f(H^{(l)}, A), \quad (6)$$

where $f$ is the propagation function, $H^{(l)}$ is an N×F$^l$ feature matrix where each row is a feature representation of a node, and $H^{(l)}=X$. At each layer, the features are aggregated to form the next layer's input features using propagation function $f$. In this way, features become increasingly more abstract at each consecutive layer. One possible propagation function (including the activation function of the subsequent activation engine) is:

$$f(H^{(l)},A)=\sigma(AH^{(l)}W^{(l)}), \quad (7)$$

where $W^{(l)}$ is the weight matrix for layer 1, and $\sigma$ is a nonlinear activation function of the subsequent activation function, such as the ReLU or the leaky ReLU function described above. Weight matrix $W^{(l)}$ is an F$^l$×F$^{l+1}$ matrix, where the second dimension F$^{l+1}$ of weight matrix $W^{(l)}$ corresponds to the number of features at the next layer. Thus, the dimensions of the output feature representations are reduced by reduce the second dimension F$^{l+1}$ of weight matrix $W^{(l)}$. The operation shown by equation (7) is similar to a filtering operation in the convolutional neural network because these weights are shared among nodes in the graph.

Equation (7) shows that, when $\sigma$ is an identity function and weight matrix $W^{(l)}$ is ignored, at the first graph convolutional layer, $H=f(X, A)=AX$. As such, at the output of the first graph convolutional layer, the representation of each node (i.e., each row) is a sum of its neighbors features. In other words, the graph convolutional layer represents each node as the aggregate of the nodes in its neighborhood, where a node $x_n$ is a neighbor of a target node if there is an edge between node $x_n$ and the target node (which is referred to as the one-hop edge-based neighbor or first-order edge-based neighbor). In various embodiments, the edges include directed edges or undirected edges.

However, using equation (7) and the adjacency matrix shown in, for example, equation (5), the aggregated representation of a node does not include its own features because $A_{i,i}=0$. To address this problem, a self-loop is added to each node by adding an identity matrix I to the adjacency matrix A shown in equation (5) before applying the propagation function. Since each node is now a neighbor of itself, the node's own features are included when summing up the features of its neighboring nodes.

In addition, using equation (7) and the adjacency matrix shown in equation (5), nodes with larger degrees have larger values in their feature representation in the outputs (because features of more neighboring nodes are aggregated) while nodes with smaller degrees may have smaller values in their feature representation in the outputs. This can cause vanishing or exploding gradients, and may also be problematic for stochastic gradient descent algorithms that are generally used to train the network and are sensitive to the scale (or range of values) of each of the input features. To address this problem, the feature representations is normalized by the node's degree, for example, by multiplying adjacency matrix A by the inverse of a diagonal degree matrix D of adjacency matrix A (i.e., $D^{-1}$ A). As described above, the degree of a node indicates the number of connections between the node and adjacent nodes through a type of motifs, such as an edge or a triangle. In another example, the feature representations are symmetrically normalized similar to the symmetric normalized Laplacian matrix by transforming adjacency matrix A according to $$D^{-\frac{1}{2}}AD^{-\frac{1}{2}}.$$

In the example shown in FIG. 3, the diagonal degree matrix D for one-hop edge-based adjacency is written as:

$$D = \begin{bmatrix} 1 & 0 & 0 & 0 & 0 & 0 & 0 \\ 0 & 5 & 0 & 0 & 0 & 0 & 0 \\ 0 & 0 & 2 & 0 & 0 & 0 & 0 \\ 0 & 0 & 0 & 2 & 0 & 0 & 0 \\ 0 & 0 & 0 & 0 & 3 & 0 & 0 \\ 0 & 0 & 0 & 0 & 0 & 3 & 0 \\ 0 & 0 & 0 & 0 & 0 & 0 & 2 \end{bmatrix}, \quad (8)$$

Thus, a multi-layer GCN is constructed using the following layer-wise propagation:

$$H^{(l+1)} = \sigma\left(\tilde{D}^{-\frac{1}{2}}\tilde{A}\tilde{D}^{-\frac{1}{2}}H^{(l)}W^{(l)}\right), \quad (9)$$

where $\tilde{A}=A+I_N$ is the modified adjacency matrix of the input graph with added self-loops, A is the original N×N adjacency matrix of the input graph with N nodes (e.g., as shown in equation (5)), and $I_N$ represents an identity matrix of size N. Degree matrix $\tilde{D}$ is the diagonal degree matrix of $\tilde{A}$ (i.e., $\tilde{D}_{i,i}=\Sigma_j \tilde{A}_{i,j}$. $H^{(l)}$ is the feature matrix inputted to layer 1. $W^{(l)}$ is a trainable embedding matrix used to embed the given inputs (typically to a lower dimension). $\sigma$ is a nonlinear activation function, such as a leaky ReLU function.

The term $$\tilde{D}^{-\frac{1}{2}}\tilde{A}\tilde{D}^{-\frac{1}{2}}$$

in equation (9) produces a symmetric normalized matrix which updates each node's feature representation via a weighted sum of the features in a node's one-hop edge-based neighborhood, where the added self-loop allows the model to include the node's own features. Each link's strength (i.e., weight) is normalized by considering the degrees of the corresponding pair of nodes. As such, at each layer 1, node i integrates neighboring features to obtain a new feature representation or embedding according to:

$$\vec{h}_i^{(l+1)} = \sigma\left(\sum_{j \in \mathcal{N}_i^{(\tilde{A})}} \alpha_{i,j}\vec{h}_j^{(l)} W^{(l)}\right), \quad (10)$$

where $\vec{h}_i^{(l)}$ represents the features of node i at layer 1, $$\alpha_{i,j} = \frac{1}{\sqrt{deg(i)deg(j)}}$$

is a fixed weight, and $\mathcal{N}_i^{(\tilde{A})}$ is the set of neighbors of node i defined by the adjacency matrix $\tilde{A}$, including itself.

In some embodiments, the weights $\alpha_{i,j}$ in equation (10) are modified to be differentiable or trainable, such that:

$$\alpha_{i,j} = \frac{\exp\left(\text{Leaky } ReLU\left(a\left[\vec{h}_i W \vec{h}_j W\right]\right)\right)}{\sum_{k \in \mathcal{N}_i^{(\tilde{A})}} \exp\left(\text{Leaky } ReLU\left(a\left[\vec{h}_i W \vec{h}_k W\right]\right)\right)}, \quad (11)$$

where a is an attention vector that is trainable and that assigns importance to the different neighbors of i, allowing the model to highlight particular neighboring node features that are more task-relevant.

Multiple graph convolutional layers as described above are stacked together to form a deep GCN (with self-attention) that is end-to-end differentiable and that uses equations (9)-(11) at each graph convolutional layer. The initial input to the model is set as $H^{(1)}=X$, where $X \in \mathbb{R}^{N \times F}$ is the initial attribute matrix with N nodes and F attributes.

The outputs $H^{(l+1)}$ of graph convolutional layer l (e.g., graph convolutional layer 320 or 340) and the subsequent activation engine (e.g., activation engine 330 or 350) are then sent as input to the next graph convolutional layer l+1, which performs similar propagation operations to integrate feature representations of nodes in the neighborhood of each target node. The weight matrix at the final layer is set accordingly to output node features at the desired feature dimension.

Because, at the output of graph convolutional layer l, the feature representations of nodes in the neighborhood of each target node include feature representations of nodes in the next-hop neighborhood of the target node, the new feature representation of the target node calculated in the next graph convolutional layer l+1 includes feature representations of nodes at two or more hops away from the target node. In this way, the feature representation of each target node includes the feature representations of more and more nodes at each subsequent graph convolutional layer. In other words, a GCN is a message-passing model, where each additional layer in a GCN allows the model to integrate information from a wider neighborhood.

Figure 4:
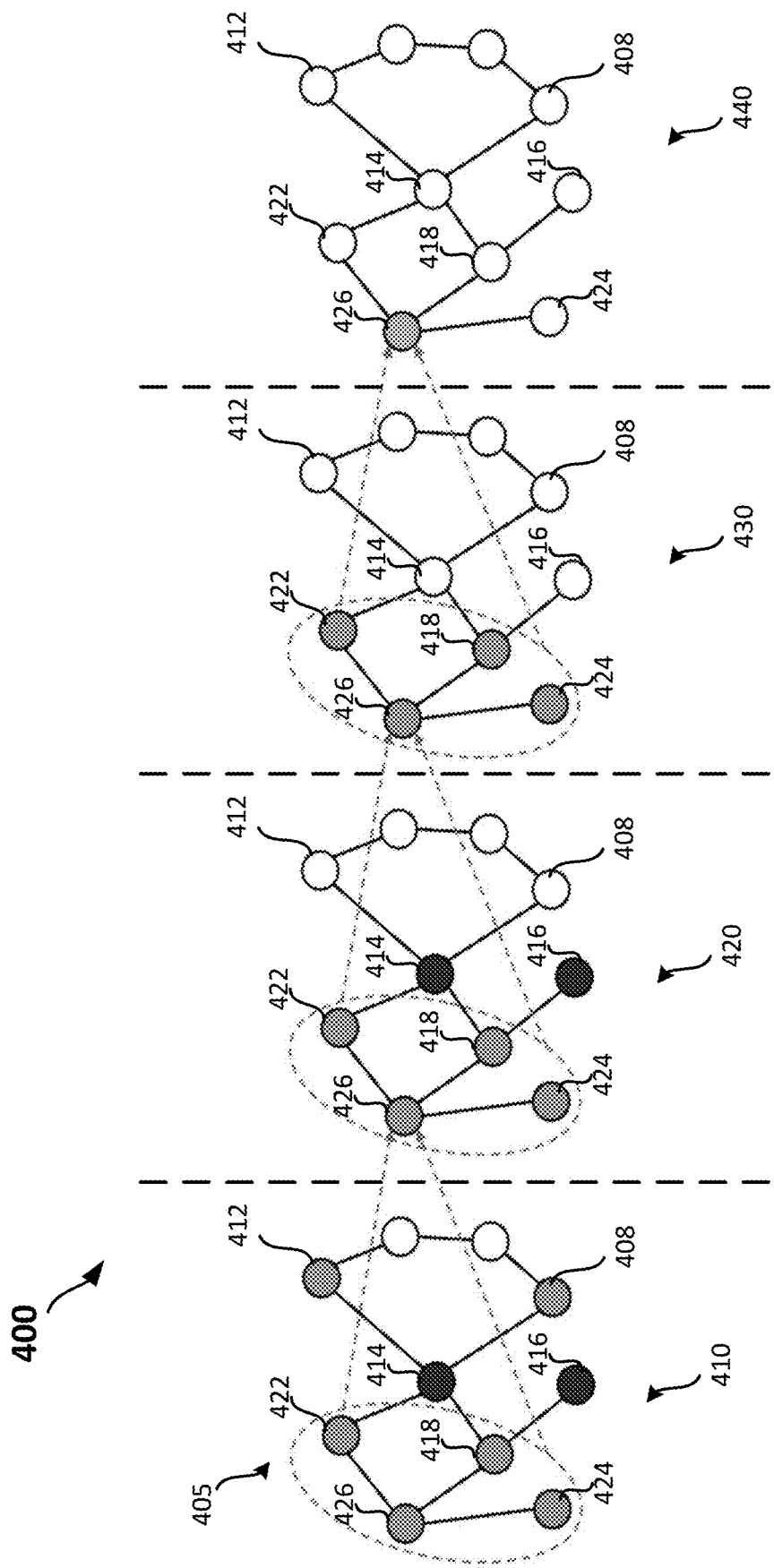
FIG. 4 illustrates an example of a process for information integration at different layers in an example of a deep graph convolutional network using one-hop edge-based adjacency according to certain embodiments.

FIG. 4 illustrates an example of a process 400 for information integration at different layers in an example of a deep graph convolutional network using one-hop edge-based adjacency according to certain embodiments. The example shown in FIG. 4 illustrates how information of neighboring nodes is propagated to a target node 426 in an input graph 405. At a first GCN layer 410, original features of nodes 418, 422, 424, and 426, which are the one-hop neighbors of target node 426 (including target node 426 itself), are aggregated (e.g., as a weighted sum) to generate new features for target node 426, as shown by the dash lines. Similarly, at first GCN layer 410, original features of nodes 414, 422, and 426 are aggregated to generate new features for node 422, original features of nodes 414, 416, 418, and 426 are aggregated to generate new features for node 418, original features of nodes 408, 412, 414, 418, and 422 are aggregated to generate new features for node 414, original features of nodes 416 and 418 are aggregated to generate new features for node 416, and so on.

At a second GCN layer 420, features of nodes 418, 422, 424, and 426 (i.e., the one-hop neighbors of target node 426) generated at first GCN layer 410 are again aggregated to generate new features for target node 426 as shown by the dash lines. Because features of nodes 418, 422, and 424 generated at first GCN layer 410 include the original features of nodes 414 and 416, the new features for target node 426 generated by second GCN layer 420 now include the original features of nodes 414 and 416 as well, which are the two-hop neighbors of target node 426. Similarly, at second GCN layer 420, features of nodes 414, 422, and 426 generated at first GCN layer 410 are aggregated to generate new features for node 422, and features of nodes 414, 416, 418, and 426 are aggregated to generate new features for node 418. Because features of nodes 414 and 416 generated by first GCN layer 410 includes the original features of nodes 408 and 412, the new features of nodes 422 and 418 now include the original features of nodes 408 and 412, which are the three-hop neighbors of target node 426.

At a third GCN layer 430, features of nodes 418, 422, 424, and 426 (i.e., the one-hop neighbors of target node 426) generated at second GCN layer 420 are again aggregated to generate new features for target node 426 as shown by the dash lines. Because the features of nodes 422 and 418 generated by second GCN layer 420 include the original features of nodes 408 and 412, which are the three-hop neighbors of target node 426, the new features for target node 426 generated by third GCN layer 430 now includes the original features of the three-hop neighbors (such as nodes 408 and 412) of target node 426. As such, at an output layer 440 of the GCN, the feature representation of target node 426 includes the aggregation (e.g., weighted sum) of the original features of nodes 408, 412, 414, 416, 418, 422, 424, and 426.

In many cases, a two-layer graph convolutional network as described above with respect to FIG. 3 provides satisfactory prediction results. However, in some cases, a GCN using the one-hop edge-based adjacency as described above with respect to FIGS. 3 and 4 may not make accurate predictions (e.g., classifications), when, for example, the information in the immediate neighborhood of a target node is sparse or noisy, or the higher order interactions of the nodes more accurately indicate the relations between the nodes.

Figure 5B:
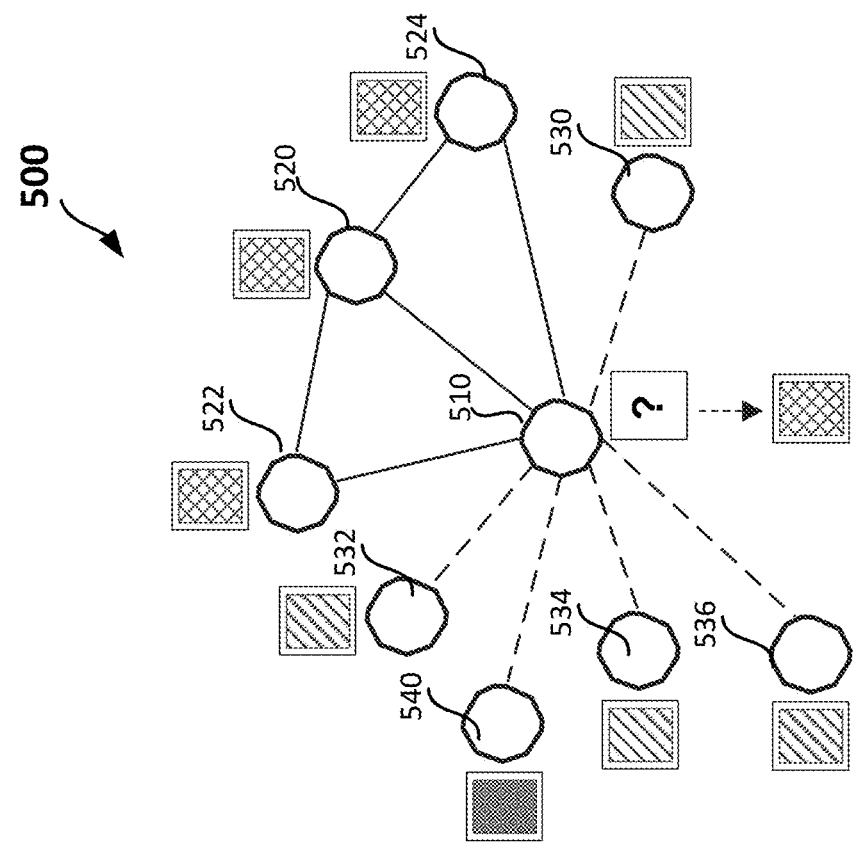
FIG. 5B illustrates an example of node classification using one-hop motif-induced adjacency in a graph according to certain embodiments.
Figure 5A:
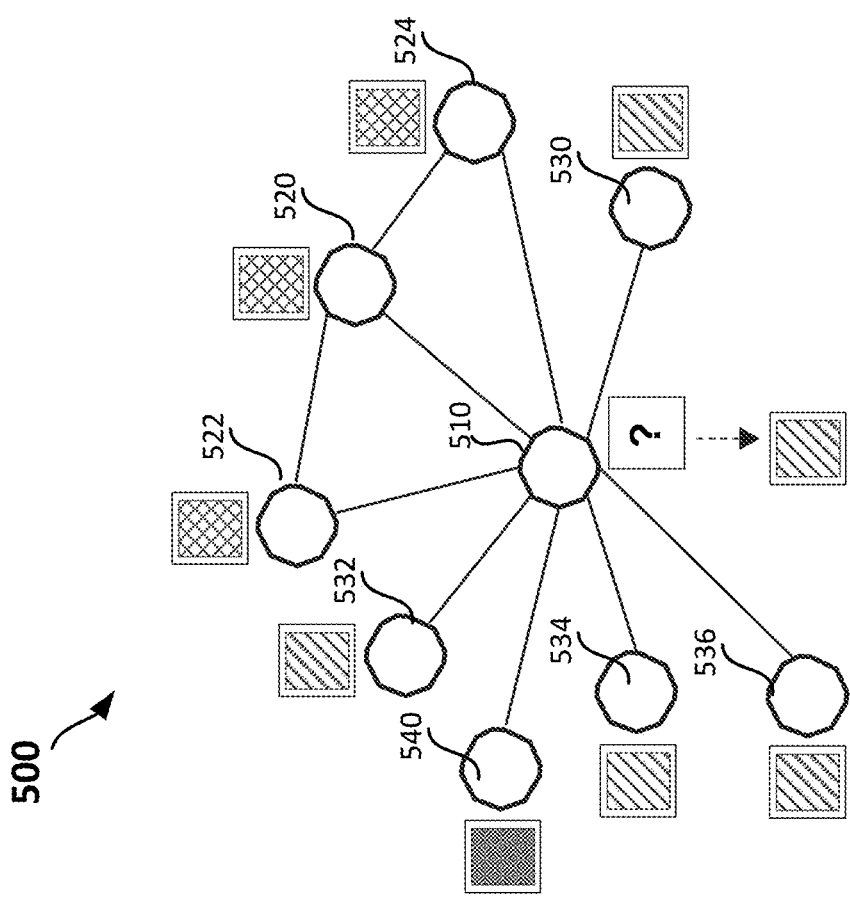
FIG. 5A illustrates an example of node classification using one-hop edge-based adjacency in a graph.

FIG. 5A illustrates an example of node classification using one-hop edge-based adjacency in a graph 500. For example, graph 500 includes a collaboration network, where each node represents a researcher, and the main research area (i.e., a feature or attribute) of the researcher is indicated by a box next to the corresponding node in graph 500. In the example, the main research area of a first researcher represented by a target node 510 is to be predicted. It is known that the first researcher has collaborated with researchers represented by nodes 520, 522, and 524 (whose main research areas are, for example, machine learning), researchers represented by nodes 530, 532, 534, and 536 (whose main research areas are, for example, visualization), and a researcher represented by node 540 (whose main research area is, for example, theory). If a GCN uses the one-hop edge-based adjacency as described above, the GCN predicts that the first researcher's main research area is the same as the research areas (e.g., visualization) of the researchers represented by nodes 530, 532, 534, and 536 because the first researcher has collaborated with 4 researchers whose main research areas are visualization, and has only collaborated with 3 researchers whose main research areas are machine learning. However, the ground truth of the main research area of the first researcher is machine learning. Thus, the GCN incorrectly infers the research area of the first researcher represented by target node 510.

FIG. 5B illustrates an example of node classification using one-hop motif-induced adjacency in graph 500 according to certain embodiments. As shown in FIG. 5B, when the GCN uses the one-hop triangle-induced adjacency, nodes 530, 532, 534, 536, and 540 are filtered out because they do not form triangles with target node 510 by the edges in graph 500. Thus, only information from nodes 510, 520, 522, and 524 is used to infer the main research area of the first researcher, because nodes 520, 522, and 524 form triangles with target node 510 through edges in graph 500 and thus are in the one-hop motif-induced neighborhood of target node 510. As such, the GCN correctly infers the research area of the first researcher represented by target node 510.

As shown by the example described above with respect to FIG. 5B, when the neighborhood is selected for a target node using a motif (such as a triangle), only neighbors connected to the target node via stronger bonds are selected, which increases the chance for the GCN to make the correct prediction or other inferences. In some embodiments, an appropriate or more relevant neighborhood is selected for a target node from nodes within multiple hops from the target node using other motifs.

Figure 6:
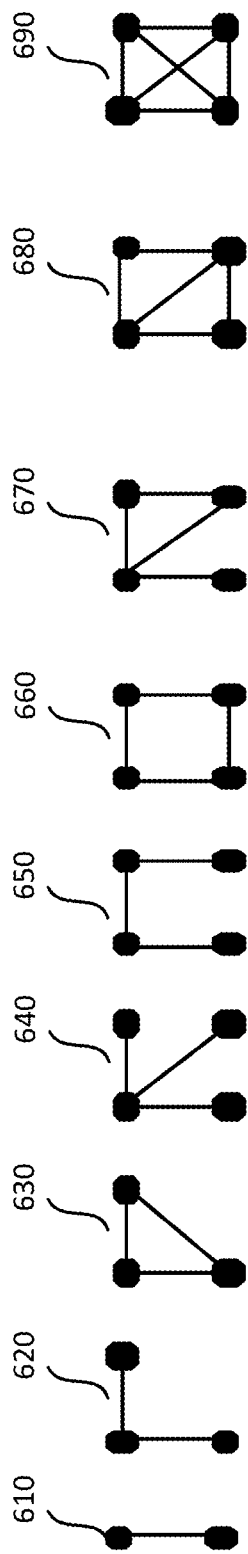
FIG. 6 illustrates various types of motifs including 2 to 4 nodes according to certain embodiments.

FIG. 6 illustrates various types of motifs including 2 to 4 nodes according to certain embodiments. The motifs includes, for example, an edge motif 610, a two-edge-star (also referred to as 2-star) motif 620, a triangle motif 630, a three-edge-star (also referred to as 3-star) motif 640, a four-node-path (also referred to as 4-path) motif 650, a four-node-cycle (also referred to as 4-cycle) motif 660, a tailed triangle motif 670, a four-node-chordal (also referred to as 4-chordal) motif 680, or a four-node-clique (also referred to as 4-clique) motif 690. Other motifs including more than four nodes are used in some embodiments. As described above, in some embodiments, a motif includes a 2-dimensional subgraph or pattern, a 3-dimensional shape (e.g., a prism or pyramid), or any multi-dimensional pattern or shape.

Figure 7B:
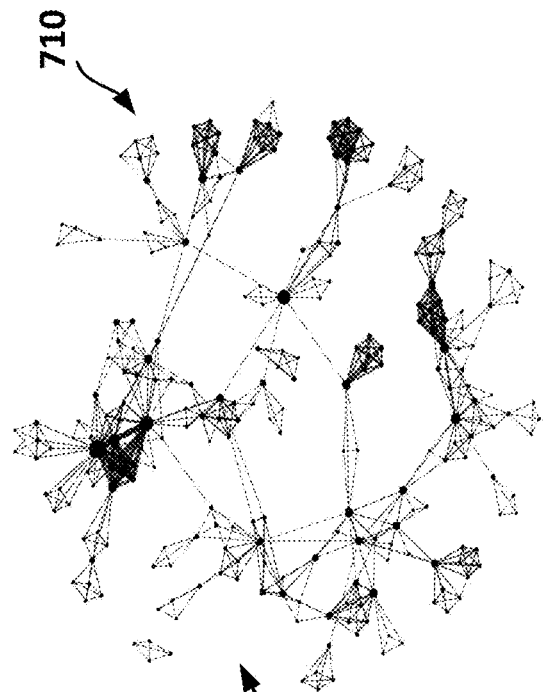
FIGS. 7A-7C illustrate that the structure of a graph differs significantly when the adjacency is determined based on higher-order structures or motifs according to certain embodiments.
Figure 7C:
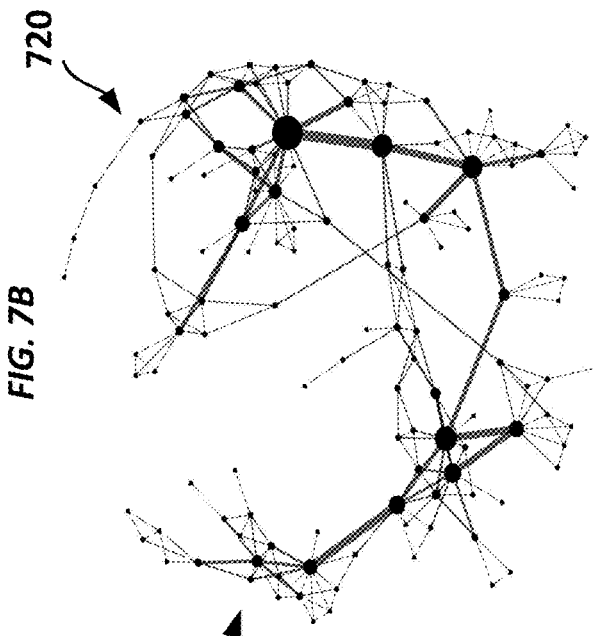
Figure 7A:
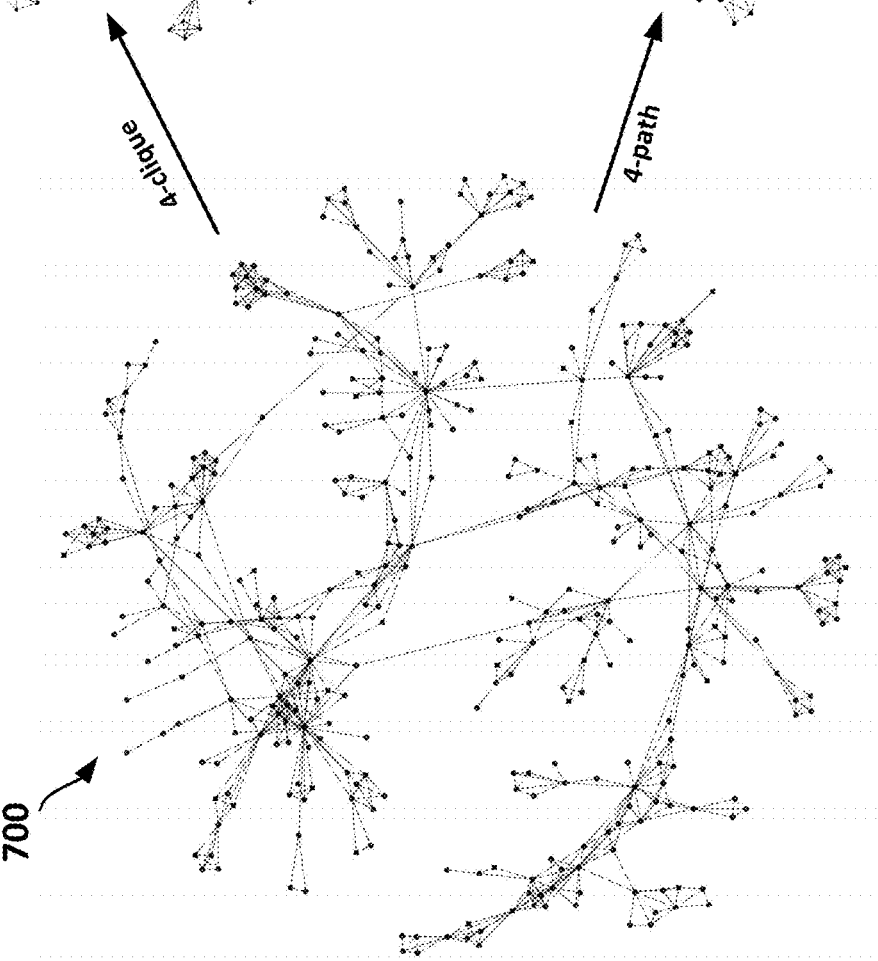

FIGS. 7A-7C illustrate that the structure of a graph differs significantly when the adjacency is determined based on higher-order structures and/or different types of motifs according to certain embodiments. FIG. 7A illustrates an example of a graph 700 that includes many nodes and edges connecting these nodes. FIG. 7B illustrates a graph 710 generated based on graph 700 shown in FIG. 7A and the 4-clique motif-induced adjacency as described above with respect to FIG. 6. FIG. 7C illustrates a graph 720 generated based on graph 700 shown in FIG. 7A and the 4-path motif-induced adjacency as described above with respect to FIG. 6. In FIGS. 7B and 7C, the size of a node or edge corresponds to the frequency of the 4-node motifs between nodes. As shown by FIGS. 7A-7C, graph 700 is filtered to keep nodes that have stronger bonds or relations, while ignoring nodes that are weakly connected to other nodes and thus are noises in the graph-structured data.

Figure 8:
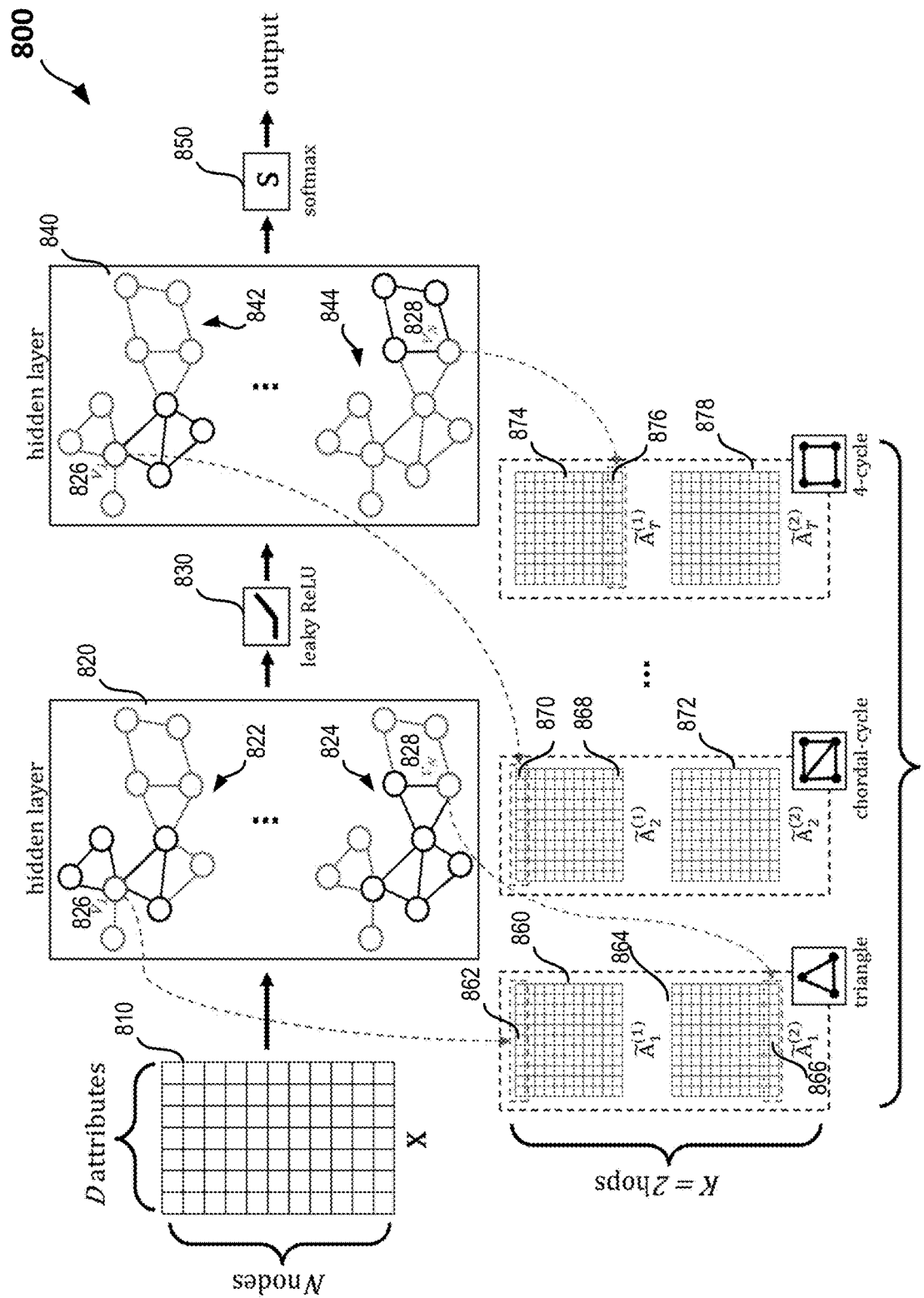
FIG. 8 illustrates an example of a two-layer graph convolutional network with motif-based attention where different adjacencies or neighborhoods are selected for different nodes in the graph according to certain embodiments.

FIG. 8 is an example of a two-layer graph convolutional network 800 using motif-based attention (i.e., MCN) where different adjacencies and neighborhoods are selected for different nodes in a graph according to certain embodiments. Graph convolutional network 800 includes a first hidden layer 820, an activation engine 830, a second hidden layer 840, and a softmax engine 850. In the example shown in FIG. 8, the graph-structured data includes N=11 nodes, where each node includes F=7 features. Thus, an adjacency matrix of the graph that describes the structure of the graph-structured data is an N×N (i.e., 11×11) square matrix, and an input feature matrix X (810) is an N×F (i.e., 11×7) matrix. Graph convolutional network 800 makes various inferences based on the adjacency matrix and input feature matrix X (810), such as node classification, link prediction (e.g., user or visitor stitching), graph classification, and the like.

As described above, it is not always suitable to use a single uniform definition of node neighborhood, such as the one-hop edge-defined neighborhood (e.g., matrix A in equation (7) or matrix Ã in equation (9)), for all nodes to propagate information. For example, FIGS. 5A and 5B show that a node benefits from using a neighborhood defined using triangle motifs to keep only neighbors connected via a stronger bond and to distinguish between weaker ties and strong ones via the triangle motifs, or other types of motifs, such as the motifs described with respect to FIG. 6.

In graph convolutional network 800, each of first hidden layer 820 and second hidden layer 840 implements an attention mechanism to select the most relevant neighborhoods for each respective node in the graph by selecting the appropriate type of motif from T possible types of motifs and selecting the step size (i.e., number of hops) k from 1 to K, where K=2 in the example shown in FIG. 8. The attention mechanism allows each node to select a different motif-induced neighborhood to accumulate information from. In addition, different types of motifs and/or step sizes are selected for a same node on different graph convolutional layers. Examples of techniques using various motifs to select neighborhoods for the nodes and using attention mechanisms to select appropriate motifs and step sizes for each respective node are described in detail below.

In some embodiments, for a given network $\mathcal{G} = (V, \varepsilon)$ with $N = |V|$ nodes and $M = |\varepsilon|$ edges, and a set of T types of motifs $\mathcal{H} = \{H_1, \ldots, H_T\}$ (such as the set of motifs described with respect to FIG. 6), a set of T different motif-induced adjacency matrices $\mathcal{A} = \{A_1, \ldots, A_T\}$ is determined, where the motif-induced adjacency matrix $A_t$ for motif t is defined as:

$(A_t)_{i,j}$ = number of motifs of type $H_t$ which each include nodes i and j.

Figures 9A, 9B:
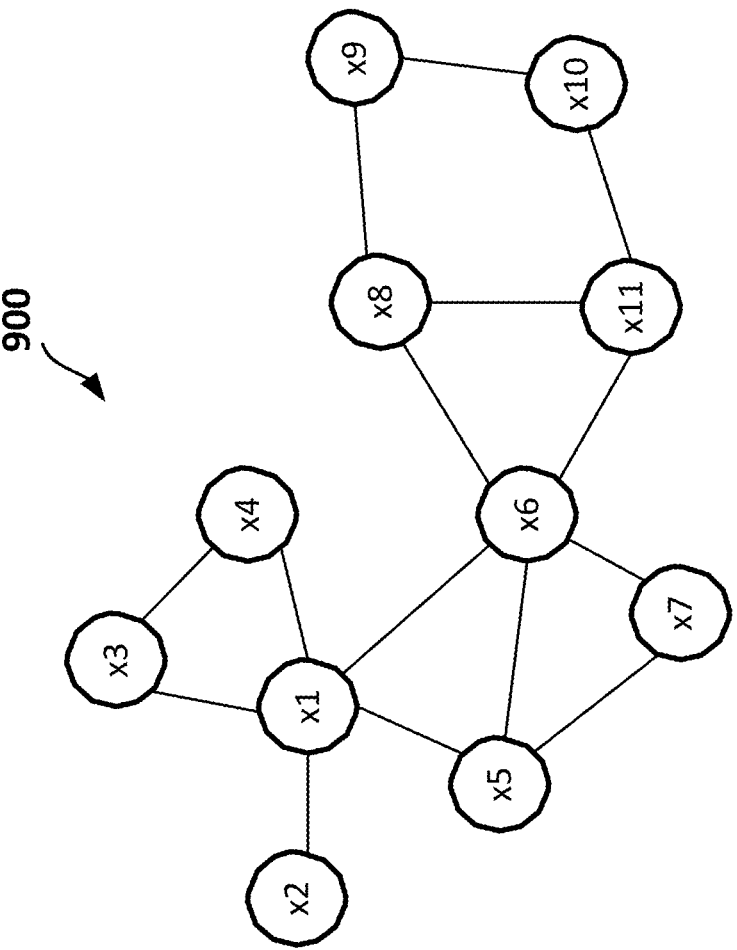
FIG. 9A illustrates an example of a graph where the adjacency is based on one-hop edges according to certain embodiments.
FIG. 9B illustrates the one-hop adjacency matrix of the graph shown in FIG. 9A.

FIG. 9A illustrates an example of a graph 900 where the adjacency is determined based on edges (e.g., edge motif 610) according to certain embodiments. Graph 900 illustrates the structure of an example of graph-structured input data to graph convolutional network 800. Graph 900 shows the edge connections between the 11 nodes (i.e., $x_1$, $x_2$, $x_3$, $x_4$, $x_5$, $x_6$, $x_7$, $x_8$, $x_9$, $x_{10}$, and $x_{11}$).

FIG. 9B illustrates a one-hop edge-based adjacency matrix 950 of graph 900 shown in FIG. 9A, which does not include the self-loop for each node. As illustrated, each row of one-hop edge-based adjacency matrix 950 corresponds to one node, and each column of one-hop edge-based adjacency matrix 950 also corresponds to one node. A value in an element of one-hop edge-based adjacency matrix 950 indicates whether there is an edge connection between the node represented by the row of the element and the node represented by the column of the element.

Figures 10A, 10B:
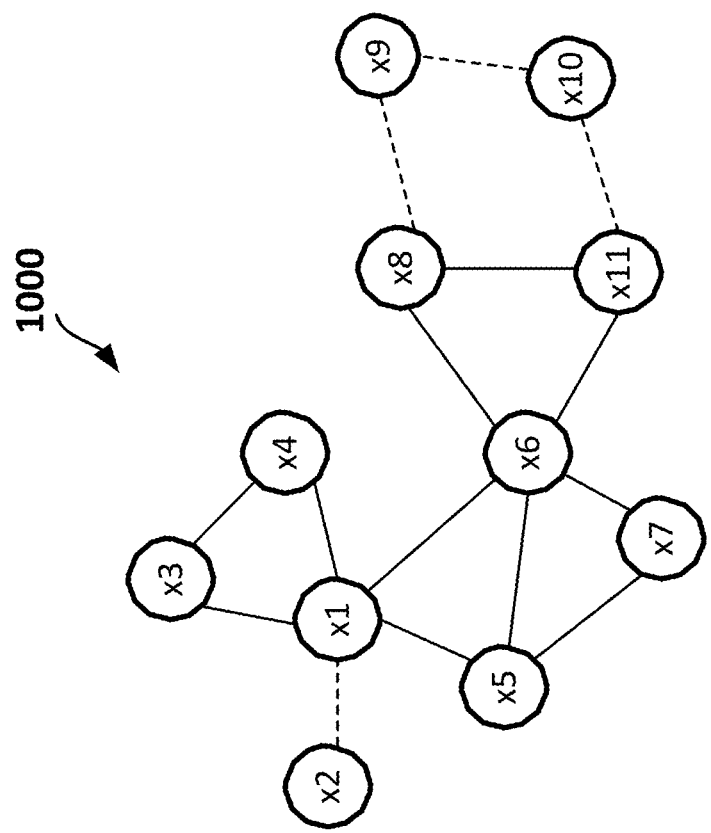
FIG. 10A illustrates an example of a graph where the adjacency is based on triangle motifs according to certain embodiments.
FIG. 10B illustrates a one-hop triangle motif-induced adjacency matrix for the graph shown in FIG. 10A.

FIG. 10A illustrates another example of a graph 1000 where the adjacency is based on triangle motifs according to certain embodiments. Graph 1000 is similar to graph 900. However, some nodes, such as nodes $x_2$, $x_9$, and $x_{10}$, are filtered out or ignored in graph 1000 because they do not form any triangle motif with any other nodes in the graph, and thus are not considered adjacent to any other nodes in graph 1000.

FIG. 10B illustrates a one-hop motif-induced adjacency matrix 1050 of graph 1000 shown in FIG. 10A, which does not include the self-loop for each node. As described above, the value in each element $(A_t)_{i,j}$ of a one-hop motif-induced adjacency matrix $A_t$ indicates the number of motifs of a type $H_t$ that each include both node i and node j. For example, because nodes $x_2$, $x_9$, and $x_{10}$ do not form any triangle motif with any other nodes in the graph, all values of elements in the rows and columns representing nodes $x_2$, $x_9$, and $x_{10}$ are "0" in one-hop motif-induced adjacency matrix 1050. For nodes $x_5$ and $x_6$, there are two triangles in graph 1000 that each include both nodes $x_5$ and $x_6$. Thus, the values of elements $(A_t)_{5,6}$ and $(A_t)_{6,5}$ are both "2" in one-hop motif-induced adjacency matrix 1050.

Each of the calculated motif adjacencies $A_t \in \mathcal{A}$ can potentially be used to define motif-induced neighborhoods $\mathcal{N}_i^{(A_t)}$ for a node i. The self-attention weights of equation (11) that are determined over a node's neighborhood can be used as reasonable initial estimates of each neighbor's importance or relevancy. In some embodiments, the motif-induced adjacency matrix $A_t \in \mathcal{A}$ (such as one-hop edge-based adjacency matrix 950 and one-hop motif-induced adjacency matrix 1050 described above) is transformed using a function $\psi: \mathbb{R}^{N \times N} \to \mathbb{R}^{N \times N}$ to determine motif-induced adjacency matrices $\tilde{A}_t$ for use in graph convolution using equation (9). As such, for a given function $\psi$, the motif-induced adjacency matrices $\tilde{A}_t$ for the T types of motifs are determined as $\tilde{A}_t = \psi(A_t)$, where t=1, ..., T. Various functions $\psi$ can be used to transform motif-induced adjacency matrices $A_t$ to motif-induced adjacency matrices $\tilde{A}_t$.

In some embodiments, unweighted motif adjacency with self-loop is determined and used for the graph convolution. In one example, motif-induced adjacency matrices $\tilde{A}_t$ is determined from motif-induced adjacency matrix $A_t$ by ignoring the weights, such that:

$$(\tilde{A}_t)_{i,j} = \begin{cases} 1 & i = j \\ 1 & (A_t)_{i,j} > 0 \\ 0 & \text{otherwise} \end{cases} \tag{12}$$

As mentioned above, the initial benefit of leveraging the weights in the motif-induced adjacency matrix $A_t$ may not be achieved using equation (12).

In some embodiments, a weighted motif adjacency matrix with row-wise maximum for graph convolution is determined by:

$$\tilde{A}_t = A_t + M, \tag{13}$$

where M is a diagonal square matrix with $M_{i,i} = \max_{1 \le j \le N} (A_t)_{i,j}$. Thus, equation (13) retains the weighted motif adjacency $A_t$ and adds row-wise maximum self-loops, which assigns an amount of importance that is equal to the amount of importance given to each node's most relevant neighbor to a self-loop.

In some embodiments, motif-induced adjacency matrices $\tilde{A}_t$ are determined from motif-induced adjacency matrix $A_t$ by:

$$\tilde{A}_t = D^{-1}(A_t + M), \tag{14}$$

where the matrix D is the diagonal square degree matrix of $A_t + M$ (i.e., $D_{i,i} = (\Sigma_k (A_t)_{i,k}) + (\max_{1 \le k \le N}(A_t)_{i,k})$), and M is the diagonal square matrix as descried above. Here, $$(\tilde{A}_t)_{i,j} = P_{i,j} = \frac{(A_t)_{i,j}}{\left(\sum_k (A_t)_{i,k}\right) + (\max_{1 \le k \le N}(A_t)_{i,k})},$$

which represents the transition probability from node i to j and is proportional to the ratio between the motif count between nodes i and j and the total motif count between node i and all its neighbors. Equation (14) generates a random walk motif transition matrix that includes row-wise maximum self-loops.

In some embodiments, motif-induced adjacency matrices $\tilde{A}_t$ is an absolute Laplacian matrix constructed by:

$$\tilde{A}_t = D + A_t, \tag{15}$$

where matrix D is the degree matrix of $A_t$. It is noted that, because the self-loop included in $\tilde{A}_t$ is a sum of all weights to a node's neighbors, the initial importance of the node itself may be disproportionately large.

In some embodiments, motif-induced adjacency matrices $\tilde{A}_t$ includes a symmetric normalized matrix with row-wise maximums constructed according to:

$$\tilde{A}_t = D^{-\frac{1}{2}}(A_t + M)D^{-\frac{1}{2}}, \tag{16}$$

where matrix D is the diagonal degree matrix of $A_t + M$.

In addition to motif-induced adjacency matrices $\tilde{A}_t$ for different types of motifs, for a pre-determined step-size K, K different k-step motif-induced adjacency matrices are determined for each of the T types of motifs. Thus, a total of K×T motif-induced adjacency matrices are constructed, which is formulated as follows:

$$\tilde{A}_t^{(k)} = \omega(A_t^k), \text{ for } k=1,\ldots,K \text{ and } t=1,\ldots,T. \tag{17}$$

where matrix $A_t^k$ is the kth power of matrix $A_t$, and $$\Psi(A_t^k) = \Psi(\underbrace{A_t \ldots A_t}_{k}). \tag{18}$$

When K>1, the graph convolutional layer accumulates information from a wider neighborhood of a node. For example, if equation (12) is used to construct a motif-induced adjacency matrices $\tilde{A}_t$ and an edge motif is used to determine $A_t$, $\tilde{A}_t^{(k)}$ captures k-hop neighborhoods of each node. It is noted that, in theory, using $\tilde{A}_t^{(k)}$ is equivalent to using k graph convolutional layers. However, extensive experiments have shown that GCNs do not necessarily benefit from a wider receptive field as a result of increasing the depth of the network model, which may be due to reasons similar to reasons why skipping some connections improves a deep neural network in which signal starts to degrade as the model becomes deeper. In another example, when equation (14) is used to construct a motif-induced adjacency matrices $\tilde{A}_t$ and an arbitrary motif is used, element $(\tilde{A}_t^{(k)})_{i,j}$ indicates the probability of transitioning from node i to node j in k steps.

For the k-step motif-induced adjacencies described herein, since the graph convolution integrates a node's own features via a self-loop, reasonable weights need to be used for the self-loops in the weighted adjacencies (i.e., the diagonal) so that a node's own features are not rendered insignificant compared with its neighbors' features.

After the K×T motif-induced adjacency matrices are constructed for T different types of motifs and a maximum step size of K, a graph convolutional network uses equation (7) or (9) to perform layer-wise propagations. In some embodiments, K×T independent GCN instances are implemented, and the final node outputs of the K×T independent GCN instances are concatenated before the classification or prediction. However, this technique is not feasible or practical when T and/or K is large due to the computation complexity.

According to certain embodiments, an attention mechanism is implemented at each graph convolutional layer to select a most relevant neighborhood for each respective node to integrate or accumulate information from. For example, for a graph convolutional layer l, two functions $f_t$: $\mathbb{R}^{S_l} \to \mathbb{R}^T$ and $f_l'$: $\mathbb{R}^{S_l} \times \mathbb{R}^T \to \mathbb{R}^K$ are used to select the type of motif and the step size, respectively, where $S_l$ is the dimension of the state matrix for layer l as described in detail below. The outputs of the two functions $f_l$ and $f_l'$ are softmaxed to form probability distributions over $\{1, \ldots, T\}$ and $\{1, \ldots, K\}$, respectively. As such, from a node i's state, the functions recommend the most relevant type of motif t and step size k for node i to integrate information from, based on the probability distribution.

In some embodiments, the state matrix encoding node states at layer l is a concatenation of two matrices according to:

$$S_l = [\psi(A) H^{(l)} W^{(l)} C], \tag{19}$$

where $W^{(l)} \in \mathbb{R}^{F^l \times F^{l+1}}$ is the weight matrix that embeds the inputs to dimension $F^{l+1}$, $\psi(A) H^{(l)} W^{(l)}$ is the matrix including local information obtained by calculating a weighted sum of the features of the nodes in the one-hop edge-based neighborhood for each node (using one-hop edge-based adjacency matrix A), and $C \in \mathbb{R}^{N \times T}$ is a motif count matrix that includes local structural information about each node. For example, motif count matrix C indicates, for each type of T different types of motifs, the number of motifs of the type that each node is associated with. It is noted that motif count matrix C is not appended to the node attribute matrix X for use in prediction. Rather, motif count matrix C is used to capture the local structural information of each node for selecting the type of motif and the step size. Motif count matrix C is precomputed once for a graph.

As described above, for each layer, function $f$ (i.e., function $f_l$, where the subscript l for layer l is omitted for brevity) produces a probability vector indicating the relevancy of the various motifs for the node in the graph, where, for node i, the motif probabilities $\vec{f}_i = f(\vec{s}_i)$, where $\vec{s}_i$ is the vector (i.e., row) corresponding to node i in state matrix $S_l$. Similarly, the probability vector recommending the step size is $\vec{f}_i' = f'(\vec{s}_i, \vec{f}_i)$. If $t_i$ is the index of the largest value in $\vec{f}_i$ and $k_i$ is the index of the largest value in $\vec{f}_i'$, motif $t_i$ is the recommended motif for node i while step size $k_i$ is the recommended step-size for node i. $t_i$ and $k_i$ are determined for each node i in nodes 1 to N, and are then used to construct an N×N propagation matrix $\hat{A}$ with motif-based attention as follows:

$$\hat{A} = \begin{bmatrix} (\tilde{A}_{t_1}^{(k_1)})_{1,:} \\ \vdots \\ (\tilde{A}_{t_N}^{(k_N)})_{N,:} \end{bmatrix}, \tag{20}$$

where each row in propagation matrix $\hat{A}$ corresponds to one node i and is the ith row in k-hop motif-based adjacency matrix $\tilde{A}_{t_i}^{(k_i)}$ that corresponds to the motif and step size selected for node i. This provides the flexibility to select the most appropriate motif and step-size for each node, in order to select the most relevant neighboring nodes for each mode to integrate information from. The N×N propagation matrix $\hat{A}$ is a layer-specific matrix, and is used in equation (9) in some embodiments to replace adjacency matrix $\tilde{A}$ for graph convolution.

Using the techniques described above, a graph convolutional network with motif attention and step-size attention is constructed and trained to perform, for example, node classification, link prediction, graph classification, or other inferences and predictions, as described above. In one example, the attention mechanism described above is trained and used in node classification or labelling as described in detail below.

For a given labeled graph $\mathcal{G} = (V, \mathcal{E}, \ell)$ with $N = |V|$ nodes, $M = |\mathcal{E}|$ edges, and a labeling function $\ell : V \to \mathcal{L}$ that maps each node to a label j in J different labels (or classes) in $\mathcal{J} = \{1, \ldots, J\}$, a classifier is trained to predict the labels of all unlabeled nodes. For example, based on a subset of nodes $\mathcal{T} \in V$ (i.e., a set of training nodes), an L-layer motif convolutional network (MCN) as described above is trained to function as the classifier using the cross-entropy loss $\mathcal{L}_C$ determined by:

$$\mathcal{L}_C = -\Sigma_{v \in \mathcal{T}} \Sigma_{j=1}^J Y_{vj} \log \pi(H_{i,j}^{(L+1)}), \tag{21}$$

where $Y_{vj}$ is a binary value indicating node v's true label (i.e., $Y_{vj} = 1$ if $\ell(v) = j$, otherwise $Y_{vj} = 0$), and $H^{(L+1)} \in \mathbb{R}^{N \times L}$ is the softmaxed output of the MCN's last layer.

While the cross-entropy loss function described in equation (21) is sufficient for training the MCN to classify nodes in input graphs, it may not be sufficient for training the attention mechanism that selects the best motif and step-size for each node at each layer. In some embodiments, the attention mechanism is trained using a second loss function based on reinforcement learning. The second loss function, which is referred to as an attention loss function $L_A$, is defined as:

$$\mathcal{L}_A = -\sum_{n_L \in \mathcal{T}} R_v \left[ \log \pi \left( (\vec{f}_{n_L}^{(L)})_{t_{n_L}^{(L)}} \right) + \log \pi \left( (\vec{f}_{n_L}^{(L)})_{k_{n_L}^{(L)}} \right) \right] + \tag{22}$$

$$\sum_{n_L \in \mathcal{T}} \sum_{n_{L-1} \in \mathcal{N}_{n_L}^{(\tilde{A}^{(L)})}} R_v \left[ \log \pi \left( (\vec{f}_{n_{L-1}}^{(L-1)})_{t_{n_{L-1}}^{(L-1)}} \right) + \log \pi \left( (\vec{f}_{n_{L-1}}^{(L-1)})_{k_{n_{L-1}}^{(L-1)}} \right) \right]$$

$$+ \ldots + \sum_{n_L \in \mathcal{T}} \ldots \sum_{n_1 \in \mathcal{N}_{n_2}^{(\tilde{A}^{(2)})}} R_v \left[ \log \pi \left( (\vec{f}_{n_1}^{(1)})_{t_{n_1}^{(1)}} \right) + \log \pi \left( (\vec{f}_{n_1}^{(1)})_{k_{n_1}^{(1)}} \right) \right],$$

where $R_v$ is the reward given to the system (e.g., $R_v = 1$ if the MCN classifies node v correctly, otherwise $R_v = -1$). The attention loss function $L_A$ is used to reward the actions of the classified nodes at the last layer; and then reward the actions of the neighbors of the classified nodes at the previous layer (if there is one) because their actions affect the outcome. This process continues until the first layer is reached. The overall loss function is then written as:

$$L = L_C + L_A. \tag{23}$$

In some embodiments, an ε-greedy strategy is used to select the motif and the step-size during training. More specifically, the ε-greedy strategy selects actions (combinations of selected motif and selected step size) with the highest probability for ε×100% of the instances (e.g., nodes), and selects a random action (e.g., a random motif and a random step size) for other instances. In some embodiments, the MCN applies dropout techniques (e.g., using one or more dropout layers as described above) during the training of the network, which is a good regularization technique and have the advantages of sampling the neighborhood during training to keep the receptive field from growing too large during training. In some embodiments, to reduce model variance, an advantage term (see, e.g., equation (2) in Lee et al., "Graph Classification using Structural Attention," KDD (2018), pp. 1666-1674) is used.

The two-layer graph convolutional network 800 can be constructed and trained using techniques described above.

As shown in FIG. 8, the one-hop motif-induced adjacency matrices $Ã_r^{(1)}$ for T types of motifs are calculated for the input graph and are shown by adjacency matrices 860, 868, . . . , and 874. The two-hop motif-induced adjacency matrices $Ã_r^{(2)}$ for the T types of motifs are also calculated and are shown by adjacency matrices 864, 872, . . . , and 878. Each row of the motif-induced adjacency matrices corresponds to one node. At each layer and for each respective node in a graph, a type of motif is selected from T types of motifs, and a step size of 1 hop or 2 hops is selected, using the attention mechanisms described above. The row corresponding to the node in the adjacency matrix for the selected motif and step size is selected for each respective node, and the selected rows for all nodes are combined to construct the propagation matrix $Â$ according to equation (20).

For example, in the example of the trained two-layer GCN 800 shown in FIG. 8, in first hidden layer 820, a one-hop triangle motif is selected for node $V_1$ 826, where the neighborhood of node $V_1$ 826 selected using the one-hop triangle motif is shown by the dark lines in graph 822, and a row 862 corresponding to node $V_1$ 826 in one-hop motif-induced adjacency matrix 860 is selected to construct the propagation matrix $Â$ according to equation (20) for use by first hidden layer 820. The type of motif, step size, and corresponding row in the corresponding motif-induced adjacency matrix are selected similarly for each of the remaining nodes, where the selected rows for all nodes are used to construct the propagation matrix $Â$ according to equation (20) for use by first hidden layer 820. For example, a two-hop triangle motif is selected for node $V_N$ 828, where the neighborhood of node $V_N$ 828 selected using the two-hop triangle motif is shown by the dark lines in graph 824, and a row 866 corresponding to node $V_N$ 828 in one-hop motif-induced adjacency matrix 860 is selected to construct the propagation matrix $Â$ according to equation (20).

In second hidden layer 840, the type of motif and step size is again selected for each node in the graph, where, for a same node, the selection at second hidden layer 840 is different from the selection at first hidden layer 820. A propagation matrix $Â$ for use by second hidden layer 840 is also constructed based on corresponding rows in the motif-induced adjacency matrices for the selected combinations of the types of motif and the step size according to equation (20). In the example shown in FIG. 8, in second hidden layer 840, a one-hop chordal-cycle motif is selected for node $V_1$ 826, where the neighborhood of node $V_1$ 826 selected using the one-hop chordal-cycle motif is shown by the dark lines in graph 842, and a row 870 corresponding to node $V_1$ 826 in one-hop motif-induced adjacency matrix 868 is selected to construct the propagation matrix $Â$ according to equation (20) for use by second hidden layer 840. The types of motif, step size, and corresponding row in the corresponding motif-induced adjacency matrix are selected similarly for each of the remaining nodes in the graph, where the selected rows for all nodes are used to construct the propagation matrix $Â$ according to equation (20) for use by second hidden layer 840. For example, a one-hop 4-cycle motif is selected for node $V_N$ 828, where the neighborhood of node $V_N$ 828 selected using the one-hop 4-cycle motif is shown by the dark lines in graph 844, and a row 876 corresponding to node $V_N$ 828 in one-hop motif-induced adjacency matrix 874 is selected to construct the propagation matrix $Â$ according to equation (20).

As described above and shown by the example in FIG. 8, techniques disclosed herein are used to construct a graph convolutional network that selects the motif and step size for each respective node to select the most relevant neighborhood for the respective node for information integration. Thus, GCNs implementing techniques disclosed herein (referred to as motif convolutional network (MCN) have the flexibility to implement one-hop edge motif-based GCNs that do not use attention mechanisms (referred to as GCN*) or one-hop edge motif-based GCNs that use self-attention mechanisms to focus on most relevant features in the neighborhood (referred to as graph attention network (GAN)). Table 2 compares some features of GCN*, GAN, and MCN.

TABLE 2

Comparison of MCN and special MCNs (e.g., GCN* and GAT)

| Method | Motif | Adjacency Matrix | Step Size K | Self-attention | Motif-attention |
|---|---|---|---|---|---|
| GCN* | edge | Equation (12) | K = 1 | no | no |
| GAT | edge | Equation (12) | K = 1 | yes | no |
| MCN | any | Equations (12)-(16) | K = {1, . . .} | yes | yes |

As described above, graph convolutional networks can be used for user or visitor stitching (sometimes referred to as entity resolution), which is a link prediction problem based on a cross-device graph. The above described techniques can be used in visitor stitching with a loss function different from the loss function defined in equation (21). The loss function defined in equation (21) is a classification loss function for classifying or labeling individual nodes in a graph. For link prediction, the task is to perform a classification (e.g., a binary classification) of the possible edges between nodes in a graph, where, for example, a positive label is assigned to each edge or link between any two nodes that are estimated to be associated with a same user, and a negative label is assigned to any other edge in the graph. As such, the loss function for the link prediction (e.g., visitor stitching) is formulated as:

$$\mathcal{L}_C = -\sum_{(u,v) \in \mathcal{E}_T} \sum_{l=1}^{2} Y_{uvl} \log \pi\left(\sigma\left(W_l\left[\vec{h}_u^{(L+1)}, \vec{h}_v^{(L+1)}\right]\right)_l\right), \quad (24)$$

where $\mathcal{E}_T$ is a training dataset including multiple positive edges (edges between any two nodes that represent a same user) and a number of randomly sampled negative edges. If an edge (u, v) is positive, $Y_{uv1}=1$; otherwise $Y_{uv2}=1$. In addition, in some embodiments of link prediction, softmax function does not need to be performed on the output of the final layer $H^{(L+1)}$. For example, $H^{(L+1)}$ is a matrix including the final learned node embeddings. $W_1$ is a trainable weight matrix that maps the embeddings for each pair of nodes into two dimensions. $\sigma$ represents the softmax operation. An end-to-end differentiable method is used to perform link prediction by replacing equation (21) with equation (24).

Techniques disclosed herein have been applied to three citation (Cora, Citeseer, & Pubmed) and two bioinformatic (DD-6 & DD-7) benchmark graph-structured datasets, and the results show the advantages of the MCN disclosed herein over other networks. The experimental results also show that different nodes do utilize the attention mechanisms disclosed herein to select different neighborhoods, which indicates that it is useful to consider various motif-defined neighborhoods. In particular, the experimental results show that neighborhoods defined by the triangle motif is very useful. The techniques disclosed herein can also be executed reasonably fast on large-scale networks as shown by example results of implementation of MCNs for several large real-world graph-structure datasets.

The MCNs disclosed herein are compared against a set of baseline techniques (including techniques that are considered the current state-of-the-art) on some benchmark graph-structured datasets. The baseline techniques used in the comparison include (in chronological order according to the publication date): fully-connected multi-layer perceptron (referred to as "MLP"), which does not take into account graph structure and takes node features as input directly; semi-supervised method based on Gaussian random fields (referred to as "LP," see, e.g., Xiaojin Zhu et al., "Semi-supervised learning using Gaussian fields and harmonic functions," ICML (2003), pp. 912-919), which places both labeled and unlabeled samples on a weighted graph with weights representing pair-wise similarity; a structured logistic regression model (referred to as "ICA," see, e.g., Qing Lu et al., "Link-based classification," ICML (2003), pp. 496-503), which leverages links between objects; a framework that is used for semi-supervised classification and uses a manifold-based regularization (referred to as "ManiReg," see, e.g., Mikhail Belkin et al., "Manifold regularization: A geometric framework for learning from labeled and unlabeled examples," JMLR 7 (2006), pp. 2399-2434); a model that integrates an unsupervised dimension reduction technique into a deep architecture to boost performance of semi-supervised learning (referred to as "SemiEmb," see, e.g., Jason Weston et al, "Deep Learning via Semi-supervised Embedding," Springer (2012), pp. 639-655); an unsupervised network embedding approach that uses a skip-gram algorithm to learn node embeddings that are similar for nodes that share a lot of links (referred to as "DeepWalk," see, e.g., Bryan Perozzi et al., "Deepwalk: Online learning of social representations," KDD (2014), pp. 701-710); a graph convolution technique that uses Chebyshev polynomials to approximate a smooth filter in the spectral domain (referred to as "Chebyshev," see, e.g., Michael Defferrard et al., "Convolutional Neural Networks on Graphs with Fast Localized Spectral Filtering," NIPS (2016), pp. 3837-3845); a method that integrates graph embedding techniques into graph-based semi-supervised learning (referred to as "Planetoid," see, e.g., Zhilin Yang et al., "Revisiting Semi-Supervised Learning with Graph Embeddings," ICML (2016), pp. 40-48), a geometric deep learning techniques that generalizes CNNs to graph-structured data (referred to as "MoNet," see, e.g., Federico Monti et al., "Deep Convolutional Networks on Graph-Structured Data," arXiv: 1611.08402 (2016)); a method that approximates spectral graph convolutions using first-order filters (referred to as "GCN*," see, e.g., Thomas N. Kipf et al., "Semi-Supervised Classification with Graph Convolutional Networks," ICLR (2017), pp. 1-14); and generalization of GCNs with added node-level self-attention (referred to as "GAT," see, e.g., Petar Velickovic et al., "Graph Attention Networks," ICLR (2018), pp. 1-12).

Three benchmark graph-structured datasets, including Cora, Citeseer, and Pubmed, are used for semi-supervised node classification. These benchmark graph-structured datasets include undirected citation networks where nodes represent documents and edges denote citation. In addition, the datasets include a bag-of-words vector capturing word counts in each document and serving as each node's feature. Each document is assigned a unique class label. Statistics of the three benchmark graph-structured datasets used in the experiments are shown in Table 3 below, where the value shown in the brackets is the percentage of the nodes used for training. In the experiments, for each dataset, 20 nodes in each class are used for training, 1,000 nodes per dataset are used for testing, and additional 500 nodes are used for validation.

TABLE 3

Statistics of three benchmark graph-structured datasets

|  | Cora | Citeseer | Pubmed |
| --- | --- | --- | --- |
| # of Nodes | 2,708 | 3,327 | 19,717 |
| # of Edges | 5,429 | 4,732 | 44,338 |
| # of Features/Node | 1,433 | 3,703 | 500 |
| # of Classes | 7 | 6 | 3 |
| # of Training Nodes | 140 (5%) | 120 (4%) | 60 (<1%) |

In the experiments, for Cora and Citeseer datasets, the MCN disclosed herein uses a 2-layer model, which includes 8 self-attention heads each having 8 hidden nodes (i.e., a total of 64 hidden nodes) in the first layer, followed by a single softmax layer for classification. The early-stopping patience is set at 100 and the $\ell_2$-regularization is set to 0.0005. For Pubmed dataset, the first layer of the MCN remains the same, the output layer includes 8 attention heads to deal with sparsity in the training data, the early-stopping patience is set at 100, and a stronger $\ell_2$-regularization of 0.001 is used.

The MCNs are further optimized by testing dropout values of $\{0.50, 0.55, 0.60, 0.65\}$, learning rates of $\{0.05, 0.005\}$, step-sizes $K \in \{1, 2, 3\}$, and motif adjacencies formed using combinations of the following motifs: edge, 2-star, triangle, 3-star, and 4-clique as described with respect to FIG. 6. The self-attention mechanism learns to prioritize neighboring features that are more relevant. $\psi$ (e.g., represented by equations (12)-(16)) is used as a reasonable initial estimate of the importance of neighboring features. For each unique setting of the hyperparameters mentioned above, equations (12)-(16) are used in the experiments, and the best result is recorded. In addition, an E-greedy strategy with $\varepsilon=0.1$ is used to select the motif and the step-size. For all three datasets, the classification accuracy averaged over 15 runs on random seeds (including standard deviation for methods that report these) is reported.

A summary of the results is shown in Table. 4. The "Avg. Rank" column shows the average rank of each technique. The lower the average rank, the better the overall performance of the technique. The results show that the MCN disclosed herein achieves superior performance over all baseline techniques on all three benchmarks. For the Cora dataset, the best MCN model uses a learning rate of 0.005, a dropout value 0.6, and both the edge and triangle motifs having a step-size K=1. In the best MCN model for the Citeseer dataset, the learning rate is 0.05, the dropout value is 0.6, and the only motif used is the edge motif with step-size K=2. The second best MCN model for the Citeseer dataset, which has comparable performance, utilizes edge, 2-star, and triangle motifs. For the Pubmed dataset, the best MCN model uses a learning rate 0.05, a dropout value 0.5, and the best motifs are the edge and triangle motifs with step-size K=1.

TABLE 4

Summary of the experimental results in "average accuracy ± standard deviation (rank)" format

| Method | Cora | Citeseer | Pubmed | Avg. Rank |
|---|---|---|---|---|
| DeepWalk | 67.2% (9) | 43.2% (11) | 65.3% (11) | 10.3 |
| MLP | 55.1% (12) | 46.5% (9) | 71.4% (9) | 10.0 |
| LP | 68.0% (8) | 45.3% (10) | 63.0% (12) | 10.0 |
| ManiReg | 59.5% (10) | 60.1% (7) | 70.7% (10) | 9.0 |
| SemiEmb | 59.0% (11) | 59.6% (8) | 71.7% (8) | 9.0 |
| ICA | 75.1% (7) | 69.1% (5) | 73.9% (7) | 6.3 |
| Planetoid | 75.7% (6) | 64.7% (6) | 77.2% (5) | 5.7 |
| Chebyshev | 81.2% (5) | 69.8% (4) | 74.4% (6) | 5.0 |
| MoNet | 81.7% (3) | — | 78.8% (4) | 3.5 |
| GCN* | 81.5% (4) | 70.3% (3) | 79.0% (2) | 3.0 |
| GAT | 83.0 ± 0.7% (2) | 72.5 ± 0.7% (2) | 79.0 ± 0.3% (2) | 2.0 |
| MCN | 83.5 ± 0.4% (1) | 73.3 ± 0.7% (1) | 79.3 ± 0.3% (1) | 1.0 |

One observation from the experimental results is that the triangle motif is consistently used by the top models on all datasets. This highlights the advantage of MCNs over other techniques (e.g., GCN* and GAT) that are not able to use neighborhoods based on higher-order structures such as triangles. The example results indicate that it is beneficial to consider stronger bonds (e.g., friends that are friends themselves) when selecting a neighborhood. The experimental results also show that the performance of the MCN models is improved by relaxing the criteria of node neighborhoods to allow the model to use attention-guided motif-induced neighborhoods.

Some tests are also performed on an MCN that does not use attention to select motif-induced neighborhoods. The tests show that the MCN without motif-based attention do not outperform MCNs with motif-based attention, and the performance of the MCN without motif-based attention drops significantly, in particular, when there are a large number of motifs in the graph.

The three benchmark datasets (i.e., Cora, Citeseer, and Pubmed datasets) that are used in the experiments described above exhibit strong homophily, where nodes sharing the same labels tend to form densely connected communities. Under these circumstances, methods that use a first-order propagation rule, such as GAT or GCN* described above, perform reasonably well. However, not all real-world graph-structured datasets have this characteristic. In many cases, the node labels spread further away from each other, where neighborhoods constructed using motifs other than the edges and triangles are more beneficial as shown by the additional experiments described below.

In the additional experiments, the MCNs are compared with GAT and GCN* using two graph-structured datasets from the DD dataset. Specifically, two largest graphs DD-6 and DD-7 in the DD dataset with a total of 4,152 and 1,396 nodes, respectively, are used in the experiments. Each of the DD-6 and DD-7 graph-structured datasets has twenty different node labels with the labels being imbalanced. In the experiments, 15 nodes per class are used for training, and the rest of the nodes are split evenly for testing and validation. This makes the problem highly challenging because the graphs do not exhibit homophily. Since the nodes do not have any attributes, the Weisfeiler-Lehman algorithm is used to generate node attributes that capture each node's neighborhood structure. More specifically, in the experiments, the node attributes are initialized to a single value and the algorithm is performed in 3 iterations. For the three techniques (i.e., GCN*, GAT, and MCN), the early-stop patience is set at 50, and a two-layer architecture with 32 hidden nodes in the first layer followed by the softmax output is used. The hyperparameters are optimized by varying the learning rate within {0.05, 0.005}, varying the $\ell_2$ regularization within {0.01, 0.001, 0.0001, 0.00001}, and varying the dropout value within {0.2, 0.3, 0.4, 0.5, 0.6}. Furthermore, for MCN, various combinations of the edge, 2-star, triangle, 4-path-edge, 3-star, 4-cycle, and 4-clique motifs and step size K from 1 to 4 are used. The Micro-F1 scores averaged over 10 runs are reported.

A summary of the results of the additional experiments described above is shown in Table 5. The results show that none of the compared techniques has particularly remarkable performances. This may be due to the small subset of nodes used for training and the lack of homophily in the graphs. The results show that, with everything else (e.g., model architecture) the same, it is generally beneficial to use motifs. For the DD-6 dataset, the best model utilizes all motifs except for the 4-path-edge with K=1. For the DD-7 dataset, the best model only uses the edge, triangle, and 4-clique motifs with K=4.

TABLE 5

Micro-F1 scores of various networks for DD datasets

| Method | DD-6 | DD-7 |
|---|---|---|
| GCN* | 11.9 ± 0.6% | 12.4 ± 0.8% |
| GAT | 11.8 ± 0.5% | 11.8 ± 1.1% |
| MCN | 12.4 ± 0.5% | 13.1 ± 0.9% |

Figures 11A, 11B:
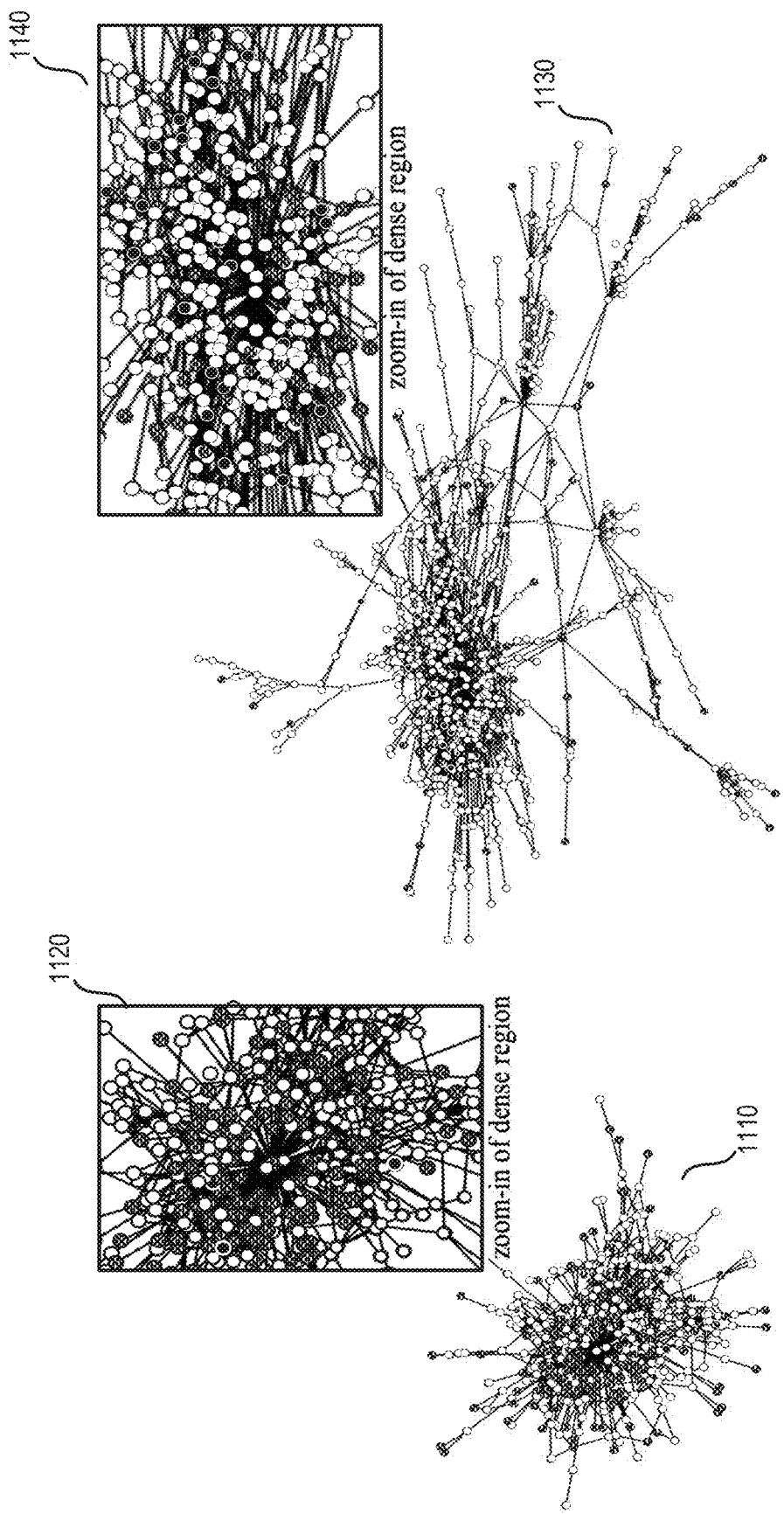
FIG. 11A illustrates a subgraph derived from class-3 data of the Cora dataset, where different motifs are selected for different nodes using the motif attention mechanism disclosed herein according to certain embodiments.
FIG. 11B illustrates a subgraph derived from class-4 data of the Cora dataset, where different motifs are selected for different nodes using the motif attention mechanism disclosed herein according to certain embodiments.

FIG. 11A illustrates a subgraph 1110 derived from class-3 data of the Cora dataset, where different motifs are selected for different nodes using the motif attention mechanism disclosed herein according to certain embodiments. FIG. 11B illustrates a subgraph 1130 derived from class-4 data of the Cora dataset, where different motifs are selected for different nodes using the motif attention mechanism disclosed herein according to certain embodiments. In the examples shown in FIGS. 11A and 11B, one-hop motifs (K=1) are used. The Cora dataset includes 2708 machine-learning papers in 7 classes: Neural Networks, Case Based, Reinforcement Learning, Probabilistic Methods, Genetic Algorithms, Rule Learning, and Theory. The citation network includes 5429 links. Each publication in the dataset is described by a 0/1-valued word vector indicating the absence/presence of the corresponding word from the dictionary. The dictionary includes 1433 unique words. FIGS. 11A and 11B show the largest connected components taken from two induced subgraphs in Cora that include nodes from (a) class 3 and (b) class 4, respectively. In FIGS. 11A and 11B, nodes are filled to indicate the motifs selected by the motif attention mechanism in the first layer. The motifs are: edge (represented by pattern-filled nodes), 4-path (represented by white nodes), and triangle (represented by black nodes). FIGS. 11A and 11B show that nodes near the fringe of the cluster, in particular, in class-4 data (shown by FIG. 11B), tend to select the 4-path motif. On the other hand, as shown in the zoom-in view of a dense region 1120 in subgraph 1110 and the zoom-in view of a dense region 1140 in subgraph 1130, nodes that use the triangle motif are fewer in number and are found in the dense regions 1120 and 1140.

A few observations are made from the results shown in FIGS. 11A and 11B. For example, the model takes advantages of the flexibility provided by the attention mechanism to select a different motif-induced neighborhood for each node. All three types of motifs are selected in the examples, and the model is not simply "defaulting" to a single type of motifs. In addition, nodes at the fringe of a cluster often prioritize the 4-path motif, in particular, in the example shown in FIG. 11B. This allows each fringe node to aggregate information from a wider neighborhood as they are more separated from the other nodes in the same class. Furthermore, nodes that choose the triangle motif appear predominantly in denser parts of the cluster. This shows that it is beneficial in these cases to consider the strong bonds in the dense parts, in particular, if these nodes also share connections with nodes from other classes (e.g., when there is noise).

In the description above, semi-supervised classification results for smaller datasets are reported because these datasets are the standard benchmark graph-structured dataset used in evaluation and because these datasets have ground-truth node labels. However, the techniques disclosed herein are fast and scalable for larger graph-structured datasets as well, as shown by experiments using several large real-world social networks described below.

Techniques disclosed herein are applied to three large real-world social networks: Delicious, Youtube-Snap, and LastFM. For reference purposes, the Cora dataset is also included in the experiments. The statistics for these datasets are shown in Table 6, where "Edge %" denotes the approximate ratio of the number of edges in the dataset versus the total number of edges in the largest dataset (i.e., LastFM).

TABLE 6

Statistics of certain large benchmark graph-structured datasets

| Dataset | # of Nodes | # of Edges | Max Degree | Avg. Degree | Edge % |
|---|---|---|---|---|---|
| Cora | 2,708 | 5,429 | 168 | 4 | <1.0% |
| Delicious | ~536K | ~1.4M | ~3K | 5 | 31.1% |
| YouTube-Snap | ~1.1M | ~3M | ~29K | 5 | 66.7% |
| LastFM | ~1.2M | ~4.5M | ~5K | 7 | 100.0% |

In the tests, the architecture of the MCN model which performs the best in previous experiments is used. More specifically, a two-layer MCN with 8 self-attention heads (each with 8 hidden nodes) in the first layer and a softmax binary classification layer in the second layer is used. The model is tested with the following motifs: edge, triangle, and 4-clique motifs, which are shown to give good performance in the experiments described above with K=1 and weighted motif-induced adjacencies. 5% of the total number of nodes is used for training, and equal numbers of nodes are used for validation and testing. Since the graphs do not have corresponding node attributes, 50 features are randomly generated for each node. Random class labels are assigned to the nodes. The average one-time training runtime (over five runs) of the MCN model for 400 epochs (which have been found in previous experiments to be sufficient in most cases for convergence) is reported.

Figure 12:
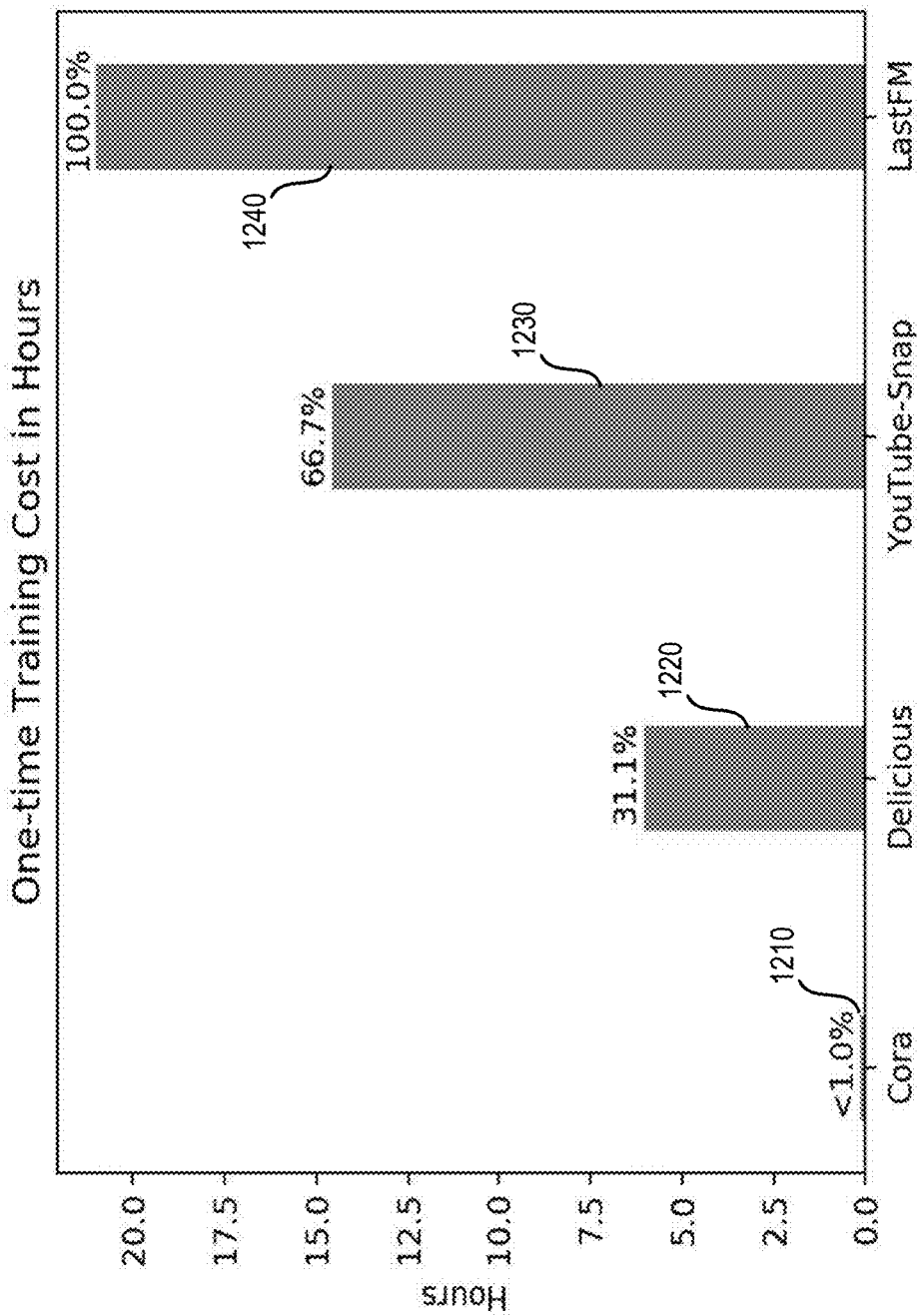
FIG. 12 illustrates the training time for datasets with different number of edges using techniques disclosed herein according to certain embodiments.

FIG. 12 illustrates examples of training time for datasets with different number of edges using techniques disclosed herein according to certain embodiments. All experiments are performed on a MacBook Pro with 2.2 GHz Intel Core i7 processors and 16 GB of RAM. The percentage values above the bars indicate the ratio of the number of edges in the dataset compared to the number of edges in the largest dataset (LastFM). FIG. 12 shows the one-time training cost for the model on four large real-world datasets. For example, as shown by a bar 1210, the training time for the Cora dataset, which has a total number of edges less than 1% of the total number of edges in the LastFM dataset, is less than 0.2 hours. As shown by a bar 1220, the training time for the Delicious dataset, the total number of edges in which is about 31.1% of the total number of edges in the LastFM dataset, is less than 6 hours. As shown by a bar 1230, the training time for the YouTube-Snap dataset, the total number of edges in which is about 66.7% of the total number of edges in the LastFM dataset, is less than 15 hours. As shown by a bar 1240, the training time for the LastFM dataset is less than 21 hours. Thus, the training time does not exceed 21 hours for any of the datasets, which is reasonable considering that the experiments are conducted on a laptop. Also, the runtime is approximately proportional to the number of edges in the graph-structured dataset. Thus, the runtime for a real-world graph-structure dataset may be short because many real-world graphs are sparse. Once the model is trained, the parameters are loaded and prediction is performed in O(1) or constant time.

Figure 13:
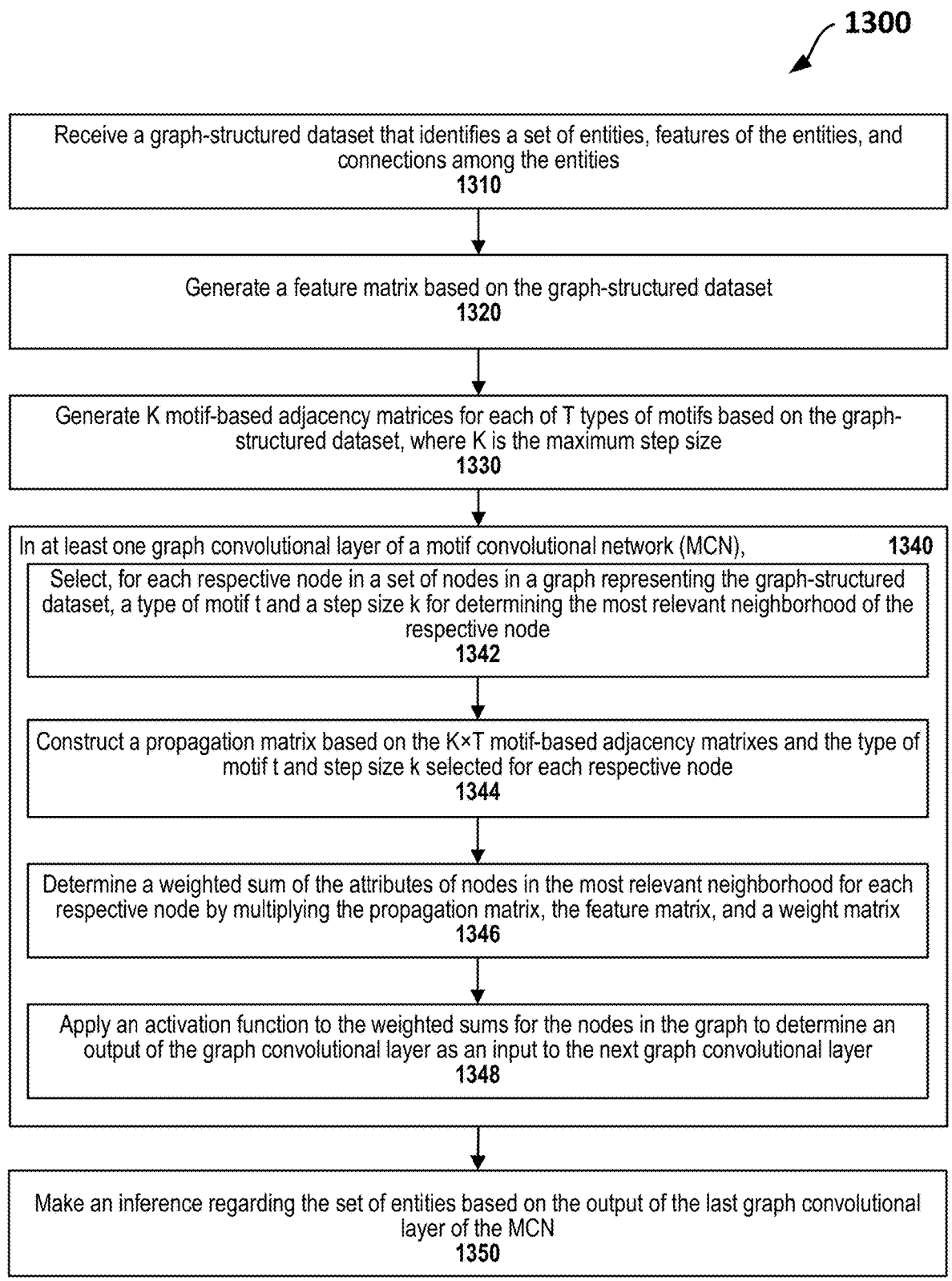
FIG. 13 is a flow chart illustrating an example of a method for making inferences from a graph-structured dataset using a motif convolutional network according to certain embodiments.

FIG. 13 is a flow chart 1300 illustrating an example of a method for making inferences from a graph-structured dataset using a motif convolutional network according to certain embodiments. The operations in flow chart 1300 are performed by, for example, a computing system that implements a motif-based graph convolutional network described above, such as graph convolutional network 100 or 800. The method is used for making inferences from both undirected and directed graph-structured datasets.

At block 1310, the computing system receives a graph-structured dataset that identifies a set of entities, features of the entities, and connections between the entities. The graph-structured dataset includes data regarding, for example, social networks, citation networks, certain web-based applications. In one example, the graph-structured dataset represents user sessions for accessing a web-based application, where each user session is an entity in the set of entities. Information related to a user session, such as the access time, duration, IP address, ID of the user device used in the user session, and the like, is used as the features or attributes of the entity. Some of the user sessions are known to be associated with a same user, and thus are indicated as connected in the graph-structured dataset. The set of entities is represented by nodes in a graph, where each node corresponds to one user session. Features of the entities are represented by the attributes of the nodes. Connections between the entities are represented by edges between pairs of nodes in the graph.

At block 1320, the computing system generates a feature matrix based on the graph-structured dataset. As described above, the feature matrix describes a set of features of the set of entities in the graph-structured dataset. For example, each column of the feature matrix corresponds to a feature, and each row of the feature matrix corresponds to one entity, where each element in the row describes a corresponding feature of the entity, such as an identification or a characteristic of the entity.

At block 1330, the computing system generates K motif-based adjacency matrices for each of T types of motifs based on the graph-structured dataset, where K is the maximum step size. Thus, there are K×T motif-induced adjacency matrices, each corresponding to a unique combination of the type of motif and the step size. The T types of motifs include any combination of, for example, an edge, a 2-star, a triangle, a 3-star, a 4-path, a 4-cycle, a tailed triangle, a chordal-cycle, a 4-clique, and the like, as described above with respect to, for example, FIG. 6. For each type of motif, a one-hop motif-induced adjacency matrix is generated for the graph. In each one-hop motif-induced adjacency matrix, each row is associated with a respective node in the graph; each column is associated with a respective node in the graph; and each element indicates a number of motifs of the respective type that each include both a node associated with a corresponding row of the element and a node associated with a corresponding column of the element. Examples of a one-hop edge-induced adjacency matrix and a one-hope triangle-induced adjacency matrix are described above with respect to, for example, equation (5) and FIGS. 9A-10B. A k-hop (or kth-order) motif-induced adjacency matrix for a type of motif is constructed as the kth power of the one-hop motif-induced adjacency matrix for the corresponding type of motif, as described above with respect to equation (18).

At block 1340, in at least one graph convolutional layer of the motif convolutional network (MCN), the computing system performs the operations described with respect to blocks 1342-1348. At block 1342, the computing system selects, for each node in a set of nodes in the graph representing the graph-structured dataset, a type of motif t and a step size k for determining the most relevant neighborhood. As described above, the computing system selects the type of motif and/or the step size using the attention mechanisms described above with respect to, for example, FIG. 8 and equation (19). In one example, the computing system selects the type of motif from multiple types of motifs by: (1) determining a motif count matrix that indicates, for each type of motif, a number of motifs of the type that each respective node belongs to; (2) determining a state matrix (see, e.g., equation (19)) that includes the motif count matrix and, for each respective node in the graph, a weighted sum of the attributes of neighboring nodes each connected to the respective node by a single edge (i.e., the one-hop edge-induced neighborhood); (3) applying a first trainable function (e.g., $f_1$) to the state matrix to determine, for each respective node, a probability value associated with each type of motif in the multiple types of motifs; and (4) selecting, for each respective node, a type of motif corresponding to a highest probability value among the multiple types of motifs as the selected type of motif t. To select the step size of the selected type of motif for each respective node in the graph, the computer system applies a second trainable function (e.g., h') to the state matrix and the probability value associated with each type of motif in the multiple types of motifs for the respective node to determine a probability value associated with each respective step size in K step sizes, and then select, for the respective node, a step size corresponding to a highest probability value among the K step sizes as the step size k. The trainable functions for selecting the type of motif and the step size are trained in a reinforcement learning process as described above with respect to, for example, equation (22).

At block 1344, the computing system constructs a propagation matrix based on the K×T motif-based adjacency matrixes and the type of motif t and step size k selected for each node. For example, as described above with respect to equations (17) and (20), the propagation matrix includes, for each respective node in the graph, a row in the k-hop (or kth-order) motif-induced adjacency matrix (e.g., $\tilde{A}_t^{(k)}$) for the type of motif t. In some embodiments, the propagation matrix is normalized, for example, using a diagonal degree matrix that indicates the total number of connections between a respective node and other nodes in the graph.

At block 1346, the computing system determines a weighted sum of the attributes of nodes within the most relevant neighborhood for each node by multiplying the propagation matrix, the feature matrix, and a weight matrix, as described above with respect to, for example, equations (7), (9), (10), and (16). Optionally, at block 1348, the computing system applies an activation function to the weighted sums for the nodes in the graph to determine an output of the graph convolutional layer, which is then used as the input to the next graph convolutional layer. The activation function is a nonlinear function, such as ReLU or leaky ReLU.

The operations at blocks 1342-1348 are performed in each graph convolutional layer. Thus, different neighborhoods are selected for a same node in the graph at different graph convolutional layers. In some embodiments, a dropout layer is used before a graph convolutional layer to mask some nodes.

At block 1350, the computing system makes an inference regarding the set of entities based on the output of the last graph convolutional layer of the MCN, such as classifying an entity or determining a connection between two entities in the set of entities. For example, as described above, the computing system implements a fully-connected layer and/or a softmax engine to make prediction or classification. For node classification, a softmax function is applied to the features of the node to be classified. For graph classification, a softmax function is applied to features of all nodes in the graph. For link prediction (e.g., visitor stitching), features of one node are multiplied by features of another node, and an activation function is applied to the product. Examples of techniques for node classification and link prediction are described above with respect to equations (21)-(24).

Figure 14:
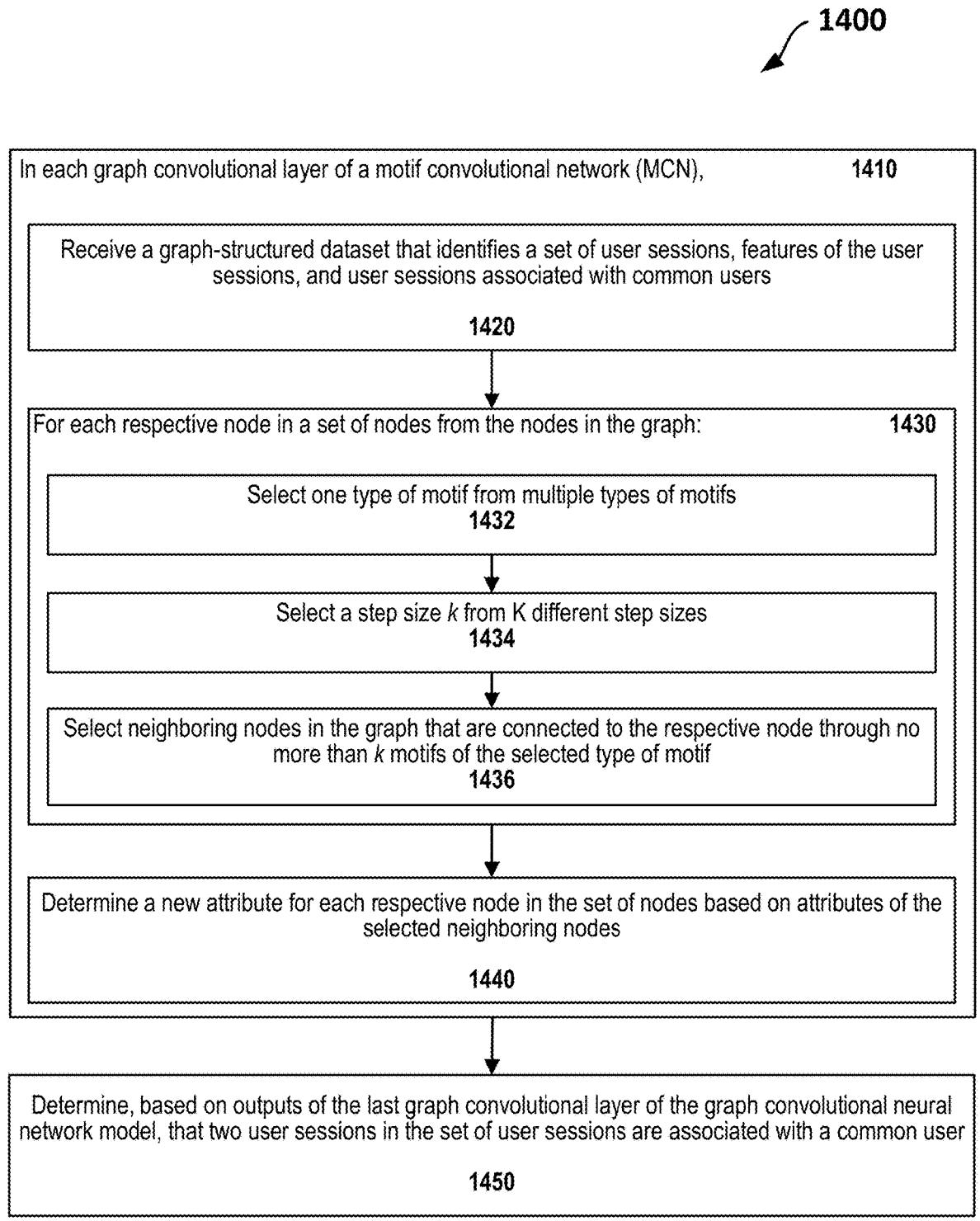
FIG. 14 is a flow chart illustrating an example of a method for visitor stitching using a motif convolutional network according to certain embodiments.

FIG. 14 is a flow chart 1400 illustrating an example of a method for visitor stitching using a motif convolutional network according to certain embodiments. The operations in flow chart 1400 are performed by, for example, a computing system that implements a motif convolutional network described above, such as graph convolutional network 100 or 800. The motif convolutional network includes one or more graph convolutional layers and/or one or more activation engines as described above. The motif convolutional network receives a dataset that identifies a set of user sessions for accessing one or more web-based applications. The dataset also includes features associated with the set of user sessions, such as user ID, device ID, IP address, time, and the like. The dataset is representable by a graph, where each node in the graph corresponds to a user session, attributes of each node correspond to features of each corresponding user session, and user sessions that are known to associate with common users (e.g., based on user ID) are connected by edges in the graph.

At block 1410, each graph convolutional layer of the motif convolutional network performs operations at blocks 1420, 1430, and 1440 to integrate information of neighboring nodes. At block 1420, each graph convolutional layer receives a graph-structured dataset that identifies a set of user sessions, features of the user sessions, and connections among the user sessions. For the first graph convolutional layer of the motif convolutional network, the graph-structured dataset includes the dataset input to the motif convolutional network. For other graph convolutional layers, the graph-structured dataset includes outputs from a preceding graph convolutional layer, such as outputs of an activation engine in the preceding graph convolutional layer.

At block 1430, the graph convolutional layer selects the most relevant neighborhood for each respective node in a set of nodes from the nodes in the graph. The set of nodes includes all or a portion of the nodes in the graph. In some embodiments, selecting the most relevant neighborhood for each respective node including selecting a type of motif from multiple types of motifs at block 1432, optionally selecting a step size k from K different step sizes (e.g., 2 or more different step sizes) at block 1434, and selecting neighboring nodes in the graph that are connected to the respective node through no more than k motifs of the selected type of motif at block 1436.

In some embodiments, selecting the type of motif from multiple types of motifs for the respective node at block 1432 includes determining a motif count matrix that indicates, for each type of motif in the multiple types of motifs, a number of motifs of the type that each respective node belongs to; determining a state matrix that includes the motif count matrix and, for each respective node in the set of nodes, a weighted sum of the attributes of neighboring nodes each connected to the respective node by a single edge; applying a first trainable function to the state matrix to determine, for each respective node in the set of nodes, a probability value associated with each type of motif in the multiple types of motifs; and selecting, for each respective node in the set of nodes, a type of motif corresponding to a highest probability value among the multiple types of motifs as the selected type of motif.

In some embodiments, selecting the step size k from K different step sizes at block 1434 includes applying a second trainable function to the state matrix and the probability value associated with each type of motif in the multiple types of motifs to determine a probability value associated with each respective step size in K step sizes; and selecting a step size k corresponding to a highest probability value among the K step sizes.

At block 1440, the graph convolutional layer determines a new attribute for each respective node in the set of nodes based on attributes of the selected neighboring nodes. The new attribute is used as the input to the next graph convolutional layer. In some embodiments, for each respective type of motif in the multiple types of motifs, a motif-induced adjacency matrix is generated based on the edges connecting the nodes in the graph. In the motif-induced adjacency matrix, each row is associated with a respective node in the graph, and each column is associated with a respective node in the graph. Each element in the motif-induced adjacency matrix indicates a number of motifs of the respective type that each include both a node associated with a corresponding row of the element and a node associated with a corresponding column of the element.

In some embodiment, the graph convolutional layer determines the new attribute for the respective node by: (1) generating a feature matrix representing the features of the set of user sessions; (2) selecting, for each respective node in the set of nodes, a row in the motif-induced adjacency matrix for the type of the motif selected for the respective node, the row corresponding to the respective node in the motif-induced adjacency matrix; (3) constructing a propagation matrix that includes the row selected for each respective node in the set of nodes; and (4) multiplying the propagation matrix and the feature matrix. In some embodiment, the graph convolutional layer determines the new attribute for the respective node by: (1) generating a feature matrix representing the features of the set of user sessions; (2) for each respective node in the set of nodes, determining a step size k, obtaining a kth-power matrix of the motif-induced adjacency matrix for the selected type of the motif, and selecting a row in the kth-power matrix, the row corresponding to the respective node; (3) constructing a propagation matrix that includes the row selected for each respective node in the set of nodes; and (4) multiplying the propagation matrix and the feature matrix. In some embodiments, the graph convolutional layer multiplies a product of the propagation matrix and the feature matrix by a trainable weight matrix. In some embodiments, the graph convolutional layer applies an activation function to the results of the multiplication to generate new attribute for the respective node.

At block 1450, the motif convolutional network determines, based on the outputs of the last graph convolutional layer of the motif convolutional network, that two user sessions in the set of user sessions are associated with a common user. In some embodiments, the motif convolutional network includes a fully-connected layer or a softmax function that makes the inference regarding whether two user sessions are associated with a same user based on the outputs of the last graph convolutional layer of the motif convolutional network.

Figure 15:
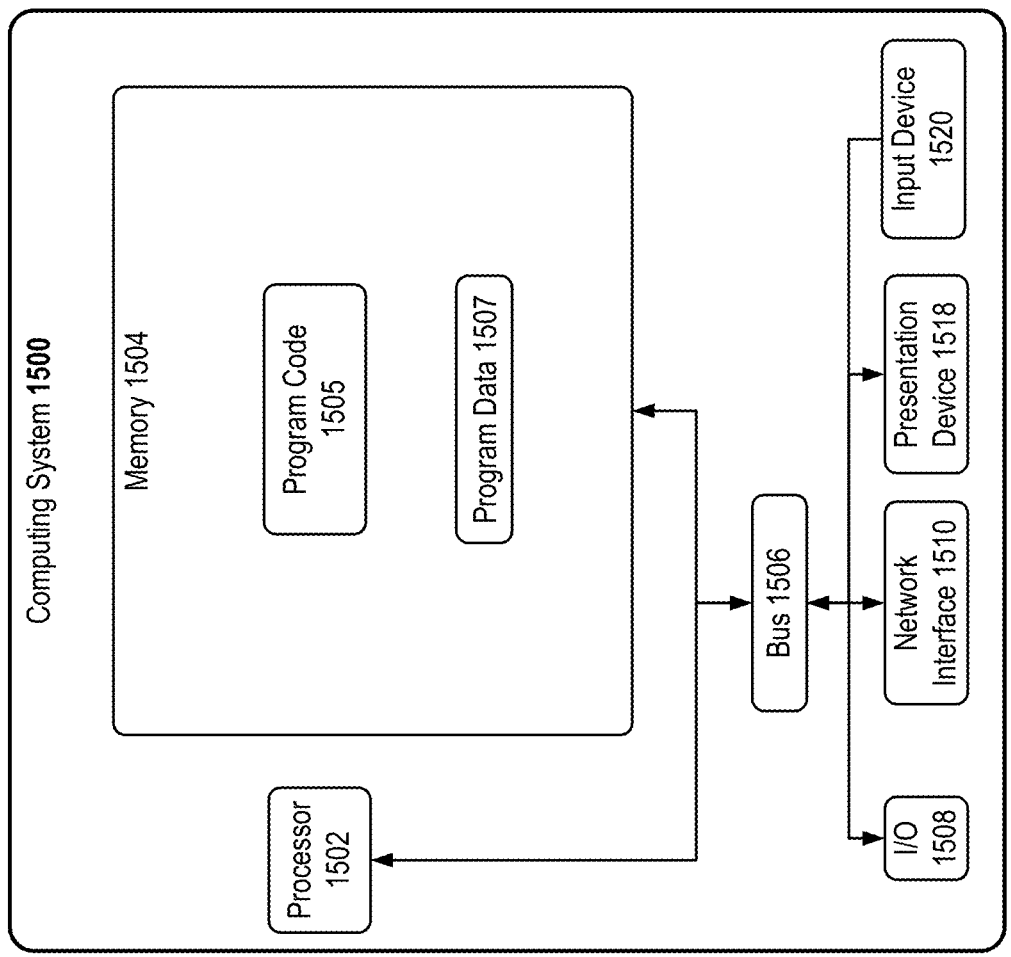
FIG. 15 illustrates an example of a computing system for implementing some of the embodiments disclosed herein.

A computing system, such as one including computing system 1500 of FIG. 15, can be configured to perform the illustrative flows and techniques described above according to some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

Any suitable computing system or group of computing systems can be used for performing the operations described herein. For example, FIG. 15 depicts an example of the computing system 1500 that may be used to implement graph convolutional network 100, 300, or 800. The depicted example of a computing system 1500 includes a processor 1502 communicatively coupled to one or more memory devices 1504. The processor 1502 executes computer-executable program code stored in a memory device 1504, accesses information stored in the memory device 1504, or both. Examples of the processor 1502 include a microprocessor, an application-specific integrated circuit ("ASIC"), a field-programmable gate array ("FPGA"), or any other suitable processing device. The processor 1502 can include any number of processing devices, including a single processing device.

A memory device 1504 includes any suitable non-transitory computer-readable medium for storing program code 1515, program data 1516, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1500 may also include a number of external or internal devices, an input device 1520, a presentation device 1518, or other input or output devices. For example, computing system 1500 is shown with one or more input/output ("I/O") interfaces 1508. An I/O interface 1508 can receive input from input devices or provide output to output devices. One or more buses 1506 are also included in the computing system 1500. The bus 1506 communicatively couples one or more components of a respective one of the computing system 1500.

The computing system 1500 executes program code 1505 that configures the processor 1502 to perform one or more of the operations described herein. Examples of the program code 1505 include, in various embodiments, program code for implementing the pseudo code described in Table 1. The program code may be resident in the memory device 1504 or any suitable computer-readable medium and may be executed by the processor 1502 or any other suitable processor.

In some embodiments, one or more memory devices 1504 stores program data 1507 that includes one or more datasets and models described herein. Examples of these datasets include interaction data, experience metrics, training interaction data or historical interaction data, transition importance data, etc. In some embodiments, one or more of data sets, models, and functions are stored in the same memory device (e.g., one of the memory devices 1504). In additional or alternative embodiments, one or more of the programs, data sets, models, and functions described herein are stored in different memory devices 1504 accessible via a data network.

In some embodiments, the computing system 1500 also includes a network interface device 1510. The network interface device 1510 includes any device or group of devices suitable for establishing a wired or wireless data connection to one or more data networks. Non-limiting examples of the network interface device 1510 include an Ethernet network adapter, a modem, and/or the like. The computing system 1500 is able to communicate with one or more other computing devices (e.g., a computing device executing an environment evaluation system 102) via a data network using the network interface device 1510.

In some embodiments, the computing system 1500 also includes the input device 1520 and the presentation device 1518 depicted in FIG. 15. An input device 1520 can include any device or group of devices suitable for receiving visual, auditory, or other suitable input that controls or affects the operations of the processor 1502. Non-limiting examples of the input device 1520 include a touchscreen, a mouse, a keyboard, a microphone, a separate mobile computing device, etc. A presentation device 1518 can include any device or group of devices suitable for providing visual, auditory, or other suitable sensory output. Non-limiting examples of the presentation device 1518 include a touchscreen, a monitor, a speaker, a separate mobile computing device, etc.

Although FIG. 15 depicts the input device 1520 and the presentation device 1518 as being local to the computing device that executes the environment evaluation system 102, other implementations are possible. For instance, in some embodiments, one or more of the input device 1520 and the presentation device 1518 can include a remote client-computing device that communicates with the computing system 1500 via the network interface device 1510 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising performing, by one or more processing devices implementing a motif convolutional neural network, operations including:

executing, by the one or more processing devices, a motif convolutional neural network including a graph convolutional neural network that includes a first graph convolutional layer, a second graph convolutional layer, and an inference layer;

performing, by the first graph convolutional layer of the graph convolutional neural network included in the motif convolutional neural network and for at least one particular node in a set of nodes in a graph identified by a dataset:

selecting a first type of multi-hop motif which connects the particular node to at least one additional node in the set of nodes received by the graph convolutional neural network-model, wherein the first type of multi-hop motif selected by the first graph convolutional layer is different from a second type of multi-hop motif selected by the second graph convolutional layer included in the graph convolutional neural network;

selecting a set of one or more neighboring nodes in the graph that are connected to the particular node through one or more motifs of the selected first type of multi-hop motif, and modifying an attribute set of the particular node to include a new attribute that is based on attributes of the selected set of one or more neighboring nodes;

providing the modified attribute set to the inference layer included in the graph convolutional neural network;

determining, via the inference layer and based on the modified attribute set provided by the first graph convolutional layer, at least one of (i) a classification for an entity represented by the particular node or (ii) a connection between the particular node and an additional node in the graph, wherein the additional node represents an additional entity;

responsive to determining the at least one of the classification or the connection, modifying the graph identified by the dataset to include the classification or the connection determined via the inference layer; and providing the modified graph to an additional computing system.

2. The method of claim 1, wherein the first type of multi-hop motif includes at least one of edges, 2-stars, triangles, 3-stars, 4-paths, 4-cycles, tailed-triangles, chordal-cycles, or 4-cliques.

3. The method of claim 1, wherein the dataset includes:
   a citation dataset in which nodes represent documents and edges denote citation; or a social network dataset, in which nodes represent users of a social network, node attributes represent features of the users, and edges represent connections between the users.

4. The method of claim 1, the operations further including:
   training a first trainable function to generate a first probability distribution associated with multiple training motifs in a training dataset;

determining a motif count matrix that indicates, for each type of motif in multiple types of motifs, a number of motifs of each type of motif to which the at least one particular node belongs;

determining a state matrix, for the first graph convolutional layer, that includes the motif count matrix and, for the at least one particular node in the set of nodes, a weighted sum of attributes of one or more neighboring nodes each connected to the at least one particular node by a single edge;

applying the trained first trainable function to the state matrix to determine, for the at least one particular node in the set of nodes, a respective first probability value associated with each type of motif in the multiple types of motifs; and selecting, for the at least one particular node in the set of nodes, the first type of multi-hop motif based on a correspondence of the first type of multi-hop motif to a highest respective first probability value among the multiple types of motifs.

5. The method of claim 4, the operations further including:

training a second trainable function to generate a second probability distribution associated with multiple step sizes in the training dataset;

applying the trained second trainable function to the state matrix and the respective first probability value associated with each type of motif in the multiple types of motifs to determine a respective second probability value associated with each respective step size in K step sizes; and selecting a step size k corresponding to a highest respective second probability value among the K step sizes, wherein selecting the set of one or more neighboring nodes in the graph that are connected to the at least one particular node through one or more motifs of the first type of multi-hop motif comprises selecting at least one neighboring node in the graph that is connected to the at least one particular node by no more than a quantity of motifs of the first type of multi-hop motif, wherein the quantity of the motifs corresponds to the step size k.

6. The method of claim 1, the operations further including:

generating, for each respective type of motif in multiple types of motifs, a motif-induced adjacency matrix based on edges connecting the nodes in the graph, wherein, in the motif-induced adjacency matrix:

each row is respectively associated with a respective node in the graph;

each column is respectively associated with a respective node in the graph; and each element indicates a number of motifs of the respective type of motif that include both a node associated with a corresponding row of the element and a node associated with a corresponding column of the element.

7. The method of claim 6, wherein determining the new attribute for the at least one particular node based on the attributes of the selected set of one or more neighboring nodes comprises:

generating a feature matrix representing features of a set of entities;

selecting, for the at least one particular node in the set of nodes, a row in the motif-induced adjacency matrix for the first type of multi-hop motif which connects the at least one particular node to the additional node, the row corresponding to the at least one respective node in the motif-induced adjacency matrix;

constructing a propagation matrix that includes the row selected for the at least one particular node in the set of nodes; and multiplying the propagation matrix and the feature matrix.

8. The method of claim 7, wherein constructing the propagation matrix further comprises:

determining a diagonal degree matrix of the propagation matrix, each diagonal element of the diagonal degree matrix indicating a total number of connections between the at least one particular node and other nodes in the graph; and normalizing the propagation matrix using the diagonal degree matrix.

9. The method of claim 7, wherein determining the new attribute for the at least one particular node further comprises:

multiplying a product of the propagation matrix and the feature matrix by a trainable weight matrix.

10. The method of claim 6, wherein determining the new attribute for the at least one particular node based on the attributes of the selected set of one or more neighboring nodes comprises:

generating a feature matrix representing features of a set of entities;

for the at least one particular node in the set of nodes:
determining a step size k, obtaining a kth-power matrix of the motif-induced adjacency matrix for the first type of multi-hop motif which connects the particular node to the at least one additional node, and selecting a row in the kth-power matrix, the row corresponding to the at least one particular node;

constructing a propagation matrix that includes the row selected for the at least one particular node in the set of nodes; and multiplying the propagation matrix and the feature matrix.

11. A system comprising a memory and a processing unit coupled with the memory, wherein the processing unit is configured to execute instructions that cause processing to be performed comprising:

implementing a motif convolutional neural network comprising a graph convolutional neural network that is executed by the processing unit, wherein the graph convolutional neural network_includes (i) an inference layer and (ii) a set of one or more layers each including a graph convolutional layer, wherein a first graph convolutional layer of the set of one or more layers included in the graph convolutional neural network is configured to, for a particular node in a set of nodes of a graph identified by a dataset:

select a first type of multi-hop motif which connects the particular node to at least one additional node in the set of nodes received by the graph convolutional neural network, wherein the first type of multi-hop motif selected by the first graph convolutional layer is different from a second type of multi-hop motif selected by a second graph convolutional layer of the set of one or more layers included in the graph convolutional neural network, select a set of one or more neighboring nodes in the graph that are connected to the particular node through one or more motifs of the selected first type of multi-hop motif, modify an attribute set of the particular node to include a new attribute that is based on attributes of the selected set of one or more neighboring nodes, and provide the modified attribute set to the inference layer included in the graph convolutional neural network;

wherein the inference layer includes a fully-connected layer or a softmax engine configured to, based on the modified attribute set provided by the first graph convolutional layer, determine at least one of (i) a classification for an entity representable by the particular node or (ii) a connection between entities representable by the particular node and the at least one additional node in the graph, responsive to determining the at least one of the classification or the connection, modifying the graph identified by the dataset to include the classification or the connection determined via the inference layer; and providing the modified graph to an additional computing system.

12. The graph convolutional neural network of claim 11, further comprising at least one of:

a dropout layer before at least one layer of the set of one or more layers, the dropout layer configured to mask one or more nodes in the graph identified by the dataset; or an activation engine after the first graph convolutional layer of the set of one or more layers, the activation engine configured to apply a nonlinear function to information outputted by the first graph convolutional layer.

13. The graph convolutional neural network of claim 11, wherein the first graph convolutional layer is further configured to, for the particular node in the set of nodes:

determine a step size k, wherein selecting the set of one or more neighboring nodes in the graph that are connected to the particular node through one or more motifs of the first type of multi-hop motif comprises selecting at least one neighboring node in the graph that is connected to the particular node through no more than a quantity of motifs of the first type of multi-hop motif, wherein the quantity of the motifs corresponds to the step size k.

14. The graph convolutional neural network of claim 13, wherein:

the first graph convolutional layer is configured to select the first type of multi-hop motif from multiple types of motifs for the particular node by:

training a first trainable function to generate a first probability distribution associated with multiple training motifs in a training dataset;

training a second trainable function to generate a second probability distribution associated with multiple step sizes in the training dataset;

determining a motif count matrix that indicates, for each type of motif in the multiple types of motifs, a number of motifs of each type to which the particular node belongs;

determining a state matrix, for the first graph convolutional layer, that includes the motif count matrix and a weighted sum of attributes of one or more neighboring nodes each connected to the particular node by a single edge;

applying the trained first trainable function to the state matrix to determine a respective first probability value associated with each type of motif in the multiple types of motifs; and selecting the first type of multi-hop motif based on a correspondence to a highest respective first probability value among the multiple types of motifs; and the first graph convolutional layer is configured to determine the step size k by:

applying the trained second trainable function to the state matrix and the respective first probability value associated with each type of motif in the multiple types of motifs to determine a respective second probability value associated with each respective step size in K step sizes; and selecting, as the step size k, a step size corresponding to a highest respective second probability value among the K step sizes.

15. A method comprising performing, by one or more processing devices implementing a motif convolutional neural network, operations including:

executing, by the one or more processing devices, the motif convolutional neural network including a graph convolutional neural network that includes a first graph convolutional layer, a second graph convolutional layer, and an inference layer;

performing, by the first graph convolutional layer of the graph convolutional neural network that is included in the motif convolutional neural network and for at least one particular node in a set of nodes in a graph identified by a dataset representing a set of user sessions:

selecting a first type of multi-hop motif which connects the particular node to at least one additional node in the set of nodes received by the graph convolutional neural network, wherein the first type of multi-hop motif selected by the first graph convolutional layer is different from a second type of multi-hop motif selected by the second graph convolutional layer included in the graph convolutional neural network, selecting a set of one or more neighboring nodes in the graph that are connected to the particular node through one or more motifs of the selected first type of multi-hop motif, and modifying an attribute set of the particular node to include a new attribute that is based on attributes of the selected set of one or more neighboring nodes;

providing the modified attribute set to the inference layer included in the graph convolutional neural network;

determining, via the inference layer and based on the modified attribute set provided by the first graph convolutional layer, that at least two user sessions in the set of user sessions are associated with a common user;

responsive to determining that the at least two user sessions are associated with the common user, modifying the graph identified by the dataset to indicate that the at least two user sessions in the set of user sessions are associated with the common user; and providing the modified graph to an additional computing system.

16. The method of claim 15, wherein selecting the first type of multi-hop motif from multiple types of motifs for the at least one particular node in the set of nodes comprises performing:

training a first trainable function to generate a first probability distribution associated with multiple training motifs in a training dataset;

determining a motif count matrix that indicates, for each type of motif in the multiple types of motifs, a number of motifs of each type to which the at least one particular node belongs;

determining a state matrix, for the first graph convolutional layer, that includes the motif count matrix and, for the at least one particular node in the set of nodes, a weighted sum of attributes of one or more neighboring nodes each connected to the particular node by a single edge;

applying the trained first trainable function to the state matrix to determine, for the at least one particular node in the set of nodes, a respective first probability value associated with each type of motif in the multiple types of motifs; and selecting, for the at least one particular node in the set of nodes, the first type of multi-hop motif based on a correspondence to a highest respective first probability value among the multiple types of motifs.

17. The method of claim 16, the operations further including:
   training a second trainable function to generate a second probability distribution associated with multiple step sizes in the training dataset;
   applying the trained second trainable function to the state matrix and the respective first probability value associated with each type of motif in the multiple types of motifs to determine a respective second probability value associated with each respective step size in K step sizes; and
   selecting a step size k corresponding to a highest respective second probability value among the K step sizes,
   wherein selecting the set of one or more neighboring nodes in the graph that are connected to the at least one particular node through one or more motifs of the first type of multi-hop motif comprises selecting at least one neighboring node in the graph that is connected to the at least one particular node by no more than k motifs of the first type of multi-hop motif.

18. The method of claim 15, the operations further including:
   generating, for each respective type of motif in multiple types of motifs, a motif-induced adjacency matrix based on edges connecting the nodes in the graph,
   wherein, in the motif-induced adjacency matrix:
   each row is respectively associated with a respective node in the graph;
   each column is respectively associated with a respective node in the graph; and
   each element indicates a number of motifs of the respective type of motif that include both a node associated with a corresponding row of the element and a node associated with a corresponding column of the element.

19. The method of claim 18, wherein determining the new attribute for the at least one particular node based on the attributes of the selected set of one or more neighboring nodes comprises:
   generating a feature matrix representing features of the set of user sessions;
   selecting, for the at least one particular node in the set of nodes, a row in the motif-induced adjacency matrix for the first type of multi-hop motif which connects the at least one particular node to the additional node, the row corresponding to the at least one particular node in the motif-induced adjacency matrix;
   constructing a propagation matrix that includes the row selected for the at least one particular node in the set of nodes; and
   multiplying the propagation matrix and the feature matrix.

20. The method of claim 18, wherein determining the new attribute for the at least one particular node based on the attributes of the selected set of one or more neighboring nodes comprises:
   generating a feature matrix representing features of the set of user sessions;
   for the at least one particular node in the set of nodes:
   determining a step size k;
   obtaining a kth-power matrix of the motif-induced adjacency matrix for the first type of multi-hop motif which connects the at least one particular node to the at least one additional node, and
   selecting a row in the kth-power matrix, the row corresponding to the at least one particular node;
   constructing a propagation matrix that includes the row selected for the at least one particular node in the set of nodes; and
   multiplying the propagation matrix and the feature matrix.

\* \* \* \* \*